United States Patent [19]

Lemble

[11] Patent Number: 5,315,504
[45] Date of Patent: May 24, 1994

[54] ELECTRONIC DOCUMENT APPROVAL SYSTEM

[75] Inventor: Philippe Lemble, Saint-Laurent du Var, France

[73] Assignee: International Business Machines Corporation, Armonk, N.Y.

[21] Appl. No.: 494,261

[22] Filed: Mar. 14, 1990

[30] Foreign Application Priority Data

Mar. 14, 1989 [EP] European Pat. Off. ........ 89480045.7

[51] Int. Cl.⁵ ...................... G06F 15/16; G06F 15/46
[52] U.S. Cl. .................................. 364/400; 395/650; 395/700; 364/918.7; 364/940.71; 364/947.5; 364/949.91; 364/DIG. 2
[58] Field of Search ............... 395/600, 700, 725, 650, 395/200; 364/400, 514, 284.3, 284.4, 918.7, 940.71, 947.5, 949.91

[56] References Cited

U.S. PATENT DOCUMENTS

| | | | |
|---|---|---|---|
| 4,503,499 | 3/1985 | Mason et al. | 364/200 |
| 4,553,206 | 11/1985 | Smutek et al. | 364/200 |
| 4,918,588 | 4/1990 | Barrett et al. | 364/200 |
| 4,962,532 | 10/1990 | Kasiraj et al. | 380/25 |
| 4,965,763 | 10/1990 | Zamora | 364/900 |
| 4,994,985 | 2/1991 | Cree et al. | 364/514 |
| 5,040,142 | 8/1991 | Mori et al. | 364/900 |
| 5,093,918 | 3/1992 | Heyen et al. | 395/725 |
| 5,245,532 | 9/1993 | Mourier | 364/400 |

*Primary Examiner*—Gareth D. Shaw
*Assistant Examiner*—Dennis M. Butler
*Attorney, Agent, or Firm*—Curtis G. Rose; Steven W. Roth

[57] ABSTRACT

In a system including electronic mail facilities made available to attached users, means are provided to enable user using any terminal connected to the system network to select a form among prestored document forms, fill said form in and then have said form mailed for approval by system users selected based on predefined and stored rules. The approval path is being permanently updated by the system. The system is made to filter access to the filled-in forms using prestored tables, and monitor the mailing and processing said filled-in forms for approval.

12 Claims, 18 Drawing Sheets

|  | FUNCTIONS | APPROVAL | DOCUMENTS |
|---|---|---|---|
| GENERAL TABLES | nodeid userid LOGON | | |
| | FUNCTION | APPFUTU | HEADERS |
| | | APPWAIT | |
| | PREVIDEL | APPDONE | COMMENTS |
| | HISTFUNC | APPHIST | |
| SPECIFIC TABLES | FàfuncDn | | Typdocàn |
| | FàfuncCn | | CONTROL TABLES |
| | | | FOLLOW-UP TABLES |

FIG. 7

ELECTRONIC DOCUMENT APPROVAL SYSTEM

FIELD OF THE INVENTION

This invention deals with approval on contents of electronically generated and mailed documents and with a system for generating, monitoring and processing said documents.

BACKGROUND OF INVENTION

Electronic mailing systems are now currently used within an increasing number of companies. Such a system enables users to exchange very quickly a lot of information using simple notes or more elaborate documents.

But documents which must be signed or approved are in most cases handled the archaic way. So every step in the process involves human intervention. The originator of the document must have a copy of the form. He gets copies of form from central stores which have to be administrated. Often he keeps copies for later use and risks using an outdated version of the form. When filling-in the form very little help is available and of course no error checking can be done. The form can often be confusing and difficult to complete, because cost considerations lead to the creation of multipurpose forms which can be used in all instances. A more elaborate form filling system has been disclosed in European application No. 0,269,875 wherein shell forms are processed.

Once the form is completed, the originator has to get it approved. The approval process can be simple (for instance approval by the originator s manager), in that case, a simple electronic mail forwarding operation would do the job.

But in most instances the requirements are more complex and several levels of management or functional approvals may be required, e.g. by a Financial Analyst, a Budget Controller, etc. . . . Often the approval process depends on data filled into the form: e.g. for a purchase order if the amount of a purchase requested doesn't exceed a given value, one level of management is sufficient, otherwise two levels of management are necessary, for instance. Also because of management decisions, approval rules for a given form can be changed without the form itself being changed.

With a conventional system, when the originator passes the document to the first approver (e.g. his manager) to get his signature (i.e. approval), he has lost control of it. He cannot be sure where the document is or who has it or if the document is hand carried or forwarded through internal mail. This prevails for any step in the approval process: first approver looses control upon transferring the document to the second approver and so on. Often approvers have to keep a paper copy of the document before passing it to the next approver.

In some instances approval has to be given by a delegate, but people may not know who the delegate is.

The approver list may also need to be modified during the approval process: an approver can be replaced by his manager, the order of approval can be changed or more information may be requested by an approver from another approver who has already signed.

Finally, all documents issued from forms and approved reach the person or the department who has to process and execute the request. First, checking must be done: data checking and approval process checking.

Then, if all is correct, action is taken such as keying the data into an operational system.

Generally, no information is returned to the originator. He has to wait until his request is satisfied, or he has to get information by phone or mail.

The documents are to be kept not only during all the time the involved approval process is running, but also after that, during a retention period fixed for each form.

All known systems, however, lack efficient means for monitoring filled-in forms (herein referred to as documents), dynamically and electronically computing any approval path to be followed by a specific form based on its contents when filled-in, and controlling said path as well as filtering any request for access to filled-in documents based on the requestor's function within the user's organization.

SUMMARY OF THE INVENTION

One object of this invention is to provide a system for accessing a prestored blank form library, selecting a form, filling-in said form, computing an approval path based on filled-in form data and on specific predefined approval rules referring to user's job or function within the population of system's attached users, and monitoring and controlling the corresponding approval operations.

Another object is to provide a system for filtering any request for access to any filled-in form (document) based on filled-in data, stored updatable approval rules and requestor's identity.

In other words, this invention addresses the automation of all the steps involved in the processing of documents whose contents require complex approvals.

That includes documents origination, approver list determination, electronic signatures (i.e. approval) authentification, finalization operations, storage and general follow-up of the process.

More particularly the invention addresses an approval system for controlling the processing of a user originated document requiring signature by electronic approval by system selected users, in an electronic mailing system including terminals attached to a digital network, virtual machines (VM) including computer means, memory and software facilities assigned to individual users, each user being assigned a job or function within the population of system attached users, and means for generating processing and monitoring electronic documents to be mailed from any terminal to any user, said approval system including:

means for storing and updating function tables wherein each system user's function and address are identified;

means for storing document forms;

means for storing predefined approval rules based on user function document type and document forms contents;

terminal controllable means for selecting, accessing, filling-in, processing and mailing any selected form whose contents is to be subjected to approval;

means sensitive to said mailing for addressing said function tables and, based upon said approval rules, for determining the approval path among the system attached users; and, means sensitive to said approval path determination for monitoring the mailing and processing of said filled-in form accordingly.

These and other objects, characteristics and advantages of the invention will be explained in the following with reference to the attached drawings.

BRIEF DESCRIPTION OF THE DRAWING

The figures attached respectively represent:

FIG. 7: a mapping of system tables to be used with the invention.

DESCRIPTION OF THE PREFERRED EMBODIMENT

Figure 1:
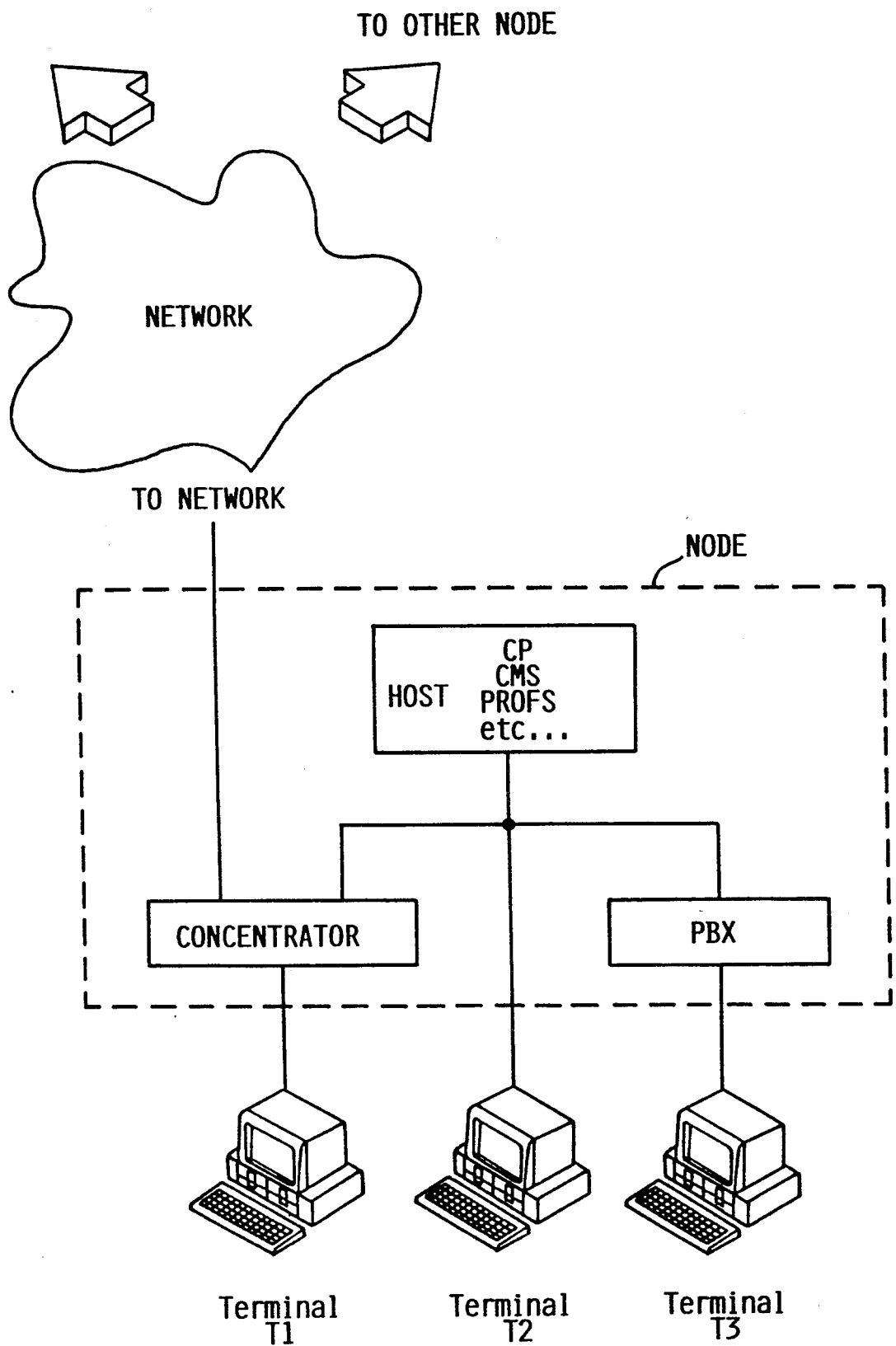
FIG. 1: digital network wherein the invention would be implemented.

Represented in FIG. 1 is a digital network node including both application resources and communication resources. Terminals T1, T2, ... for instance IBM 327X or 317X, i.e. intelligent displays, are attached to a host computer (IBM 3090) either directly, or through a concentrator or Communication Controller (IBM 3725) or a PBX for remote terminals. Several similar nodes are connected into a digital network leading thus to thousands of terminals attached to the network. Users sitting at any terminal can both perform selected tasks using the network software resources, and communicate with each other at will, day and night, by simple keyboard operations.

Let's assume the system including the host computer is operating in a VM/SP environment. Each person, or end user, is assigned a Virtual Machine (machine) in the computer system within a given node of the network. Virtual Machine means in fact a predetermined size memory location sometimes referred to as user's A-disk and means to share common computer hardware and software resources, essentially including the IBM Control Program (CP) and Conversational Monitor System (CMS), each including its own types of services. CP manages system resources and provides an individual working environment for each person using the system.

Resources managed by CP include: Processor functions: processor storage and input/output devices. CP creates the system work environment. It controls the system resources that are available to the user during a work session.

CMS, although a component of VM/SP operating system, is itself an operating system running under CP. As the name "conversational" implies, there is a two way communication between the system users and CMS.

For more detailed information on IBM CP and CMS one may refer to the following IBM documents:

Virtual Machine/System Product (VM/SP) General information, GC20-1838.

Virtual Machine/System Product: CMS USER's Guide, SC19-6210.

Virtual Machine/System Product: System Product Editor User's Guide, SC24-5220.

Figure 2:
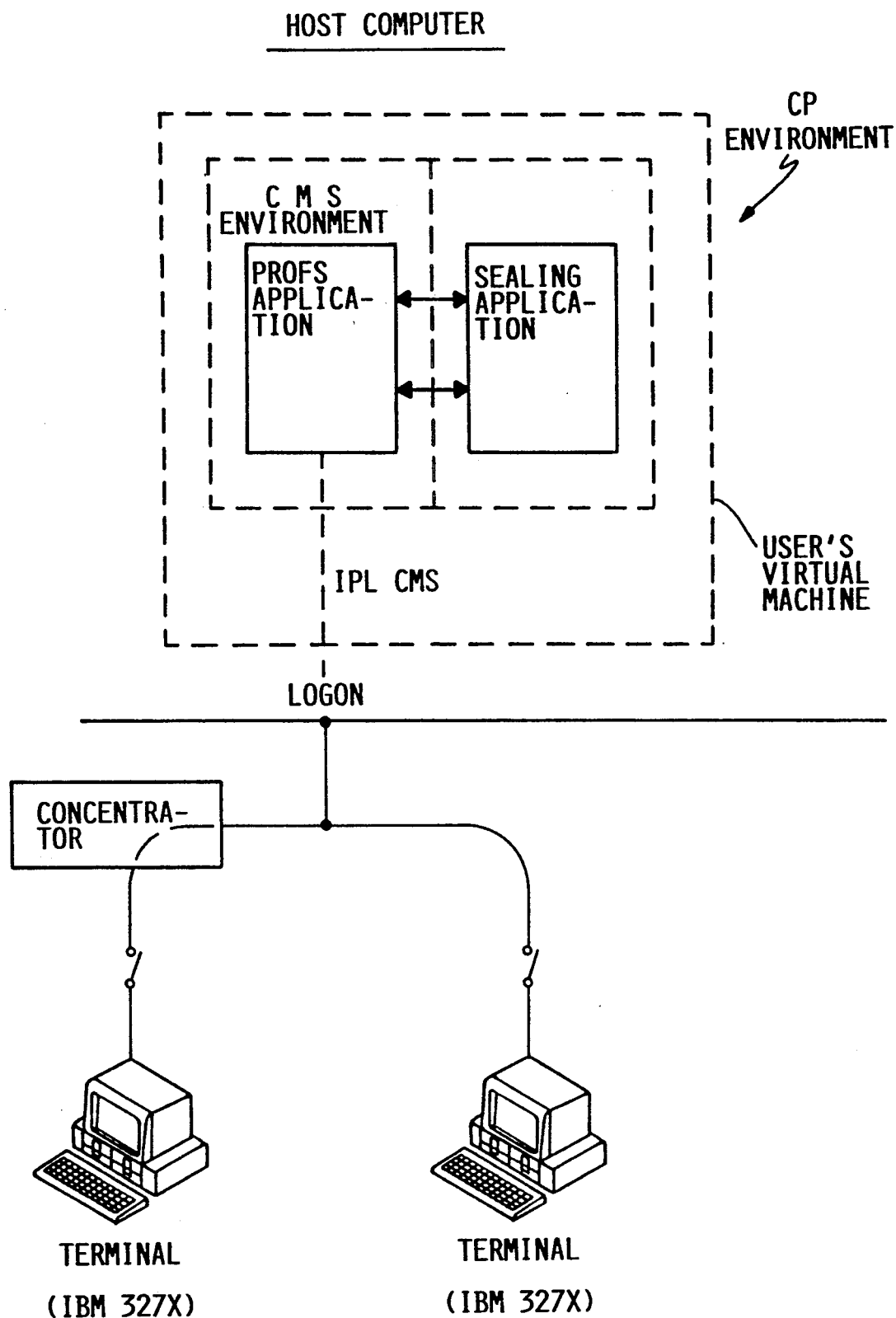
FIG. 2: portion of a network of FIG. 1.

As illustrated in FIG. 2, a user may initiate a session using any of the terminals attached to the network, and through a log-on procedure reach his/her machine. Logging-on means sending an interrupt command from the keyboard to reach CP facilities and then identifying himself (herself) to the system by typing a personal identification code (userid) and in most cases a password. Password use enables forbidding access to a given "machine" by anyone but the machine "owner". Passwords are secret and known to the sole owner. Then CMS resources and/or any other software resources (e.g. IBM PROFS application programs) and/or any other specific software, such as the one designated here by "SEALING" designed for this invention, may either be accessed on request or be accessed directly. This is defined in the user's PROFILE EXEC routine tailored to identify the available resources assigned (i.e. made available) to the specific user upon originally defining the user's machine. For more detailed information on IBM PROFS one may refer to the following IBM document: Using the Professional Office System (Order No. SH20-5604)

Figure 3:
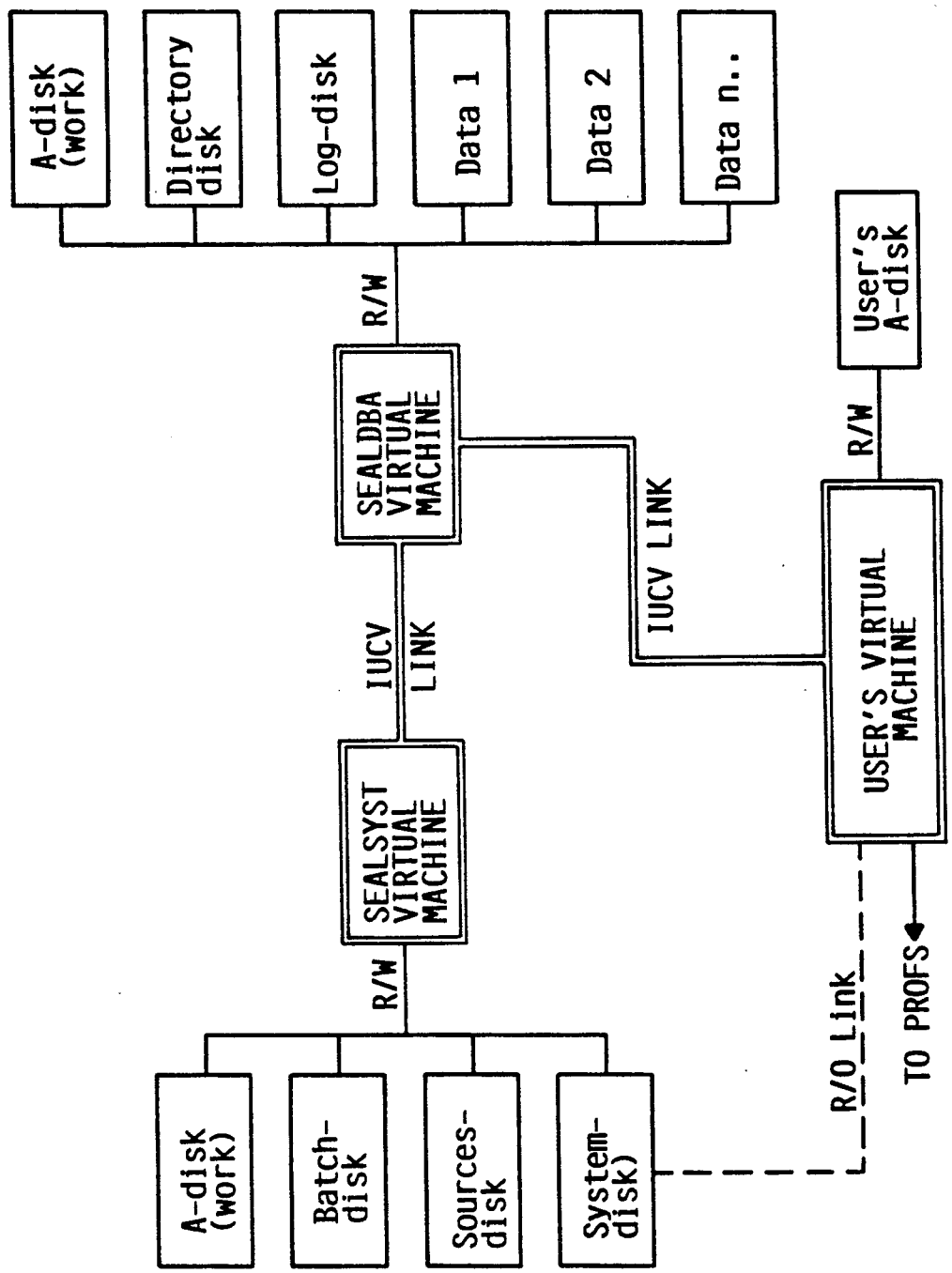
FIG. 3: a basic system architecture for implementing this invention.

In addition, for the purpose of this invention, a specific environment has been tailored within the system as represented in FIG. 3 showing details of the so called "SEALING" environment. Said environment includes a data base machine (SEALDBA) and a system machine (SEALSYST) in addition to user's VM machines.

SEALDBA is a virtual machine running in disconnected mode as a SQL/DS data base administrator machine. Attached to the SEALDBA machine are several mini-disks operating in a read/write (R/W) mode:

an A-disk only used as working disk for maintenance operations:

a Directory disk containing the data-base directory:

a Log-disk which supports logging of all the work units and allows rollback in case of problem; and, several Data disks: at least one for common system tables, and as many as required by different forms supported (document/form meaning will be defined further). The SEALDBA machine may be considered an SQL machine essentially including the data bases in SQL form.

SEALSYST is the SEALING system virtual machine. Attached to this machine are several mini-disks:

an A-disk only used as working disk for maintenance operations:

a Batch-disk to support Batch operations;

a Source-disk which contains the source of all the programs; and a System-disk which contains all necessary routines for a user to run the SEALING application. i.e. routines needed by the approval application and further defined in this description. When a user wants to run the application, he has to make a read-only link to this minidisk.

The USER'S VIRTUAL MACHINE is a standard VM machine with a memory size of 2 Meg and a user's A-disk. A-disk is mainly used to store documents drafts and to support print operations.

Both, the standard user's VM machine and the SEALSYST machine may communicate with the SQL/DS data base administrator machine via Inter User Communication Vehicle (IUCV Link).

This system architecture provides several advantages which will be made apparent in the following description. But, it may already be stated that it contributes to provide a higher security level to the approval process. To that end, the only SQL commands the end user may use are predefined into access modules stored into the SEALDBA machine attached disks. The IUCV link enables accessing and running these modules, and only these modules, from the user's terminal.

To simplify understanding the detailed description of the preferred embodiment, one may first note the following assumptions. Unfilled (blank) forms have been designed and stored in the system (SEALSYST) for further use and conversion into documents to be processed (e.g. approved) using the invention.

Approvers are normally designated by reference to their function. e.g. manager first, second, . . . line of department No. xx. The function may be delegated, in which case the "acting" person would be different from the original assignee (titular) of the function.

When the system user (originator of a considered document) wishes to forward the document for proper approval, the approval path is dynamically computed using the contents of specific data fields within the document, and predefined approval rules. In the following implementation, the approvers may have been split into two categories: "Authorizers" and "Reviewers". Only an authorizer may accept (concur) or reject a document. A reviewer can only give an advice. A negative reviewer's opinion requires a subsequent authorizer approval for the document to proceed.

Finally, after being processed by the last approver, the document is forwarded automatically to a finalizing VM machine performing conventional operations such update, format and if required encrypt and send through the network to another network node and, for the purpose of this invention, perform a control operation tailored to ascertain a higher security level to the approval system.

Figure 4:
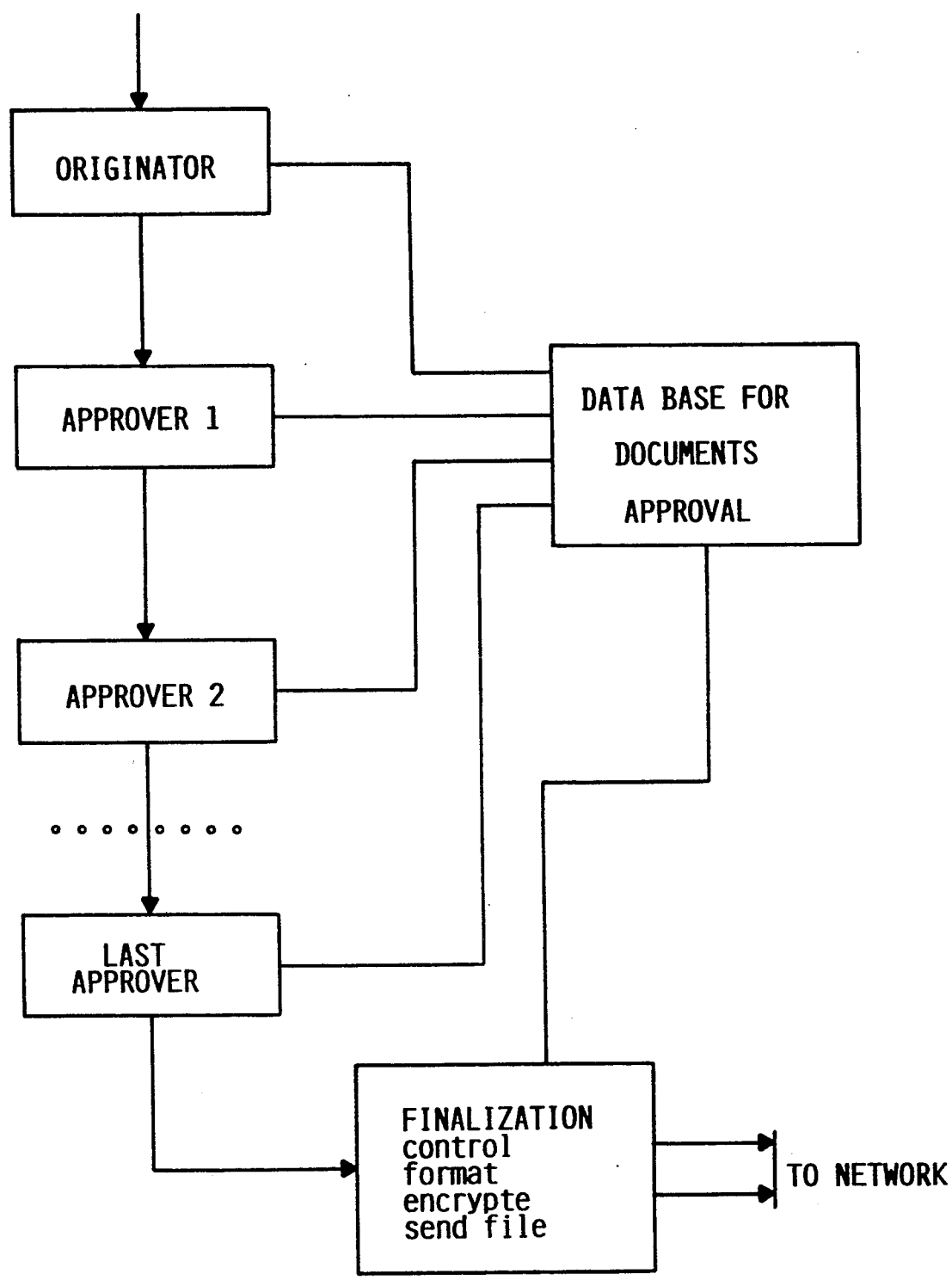
FIG. 4: a flow chart for the invention.

The above operations are summarized in FIG. 4, using the facilities made available through SEALDBA. SEALSYST as well as the VM user s machine.

It should be noted therein, that the document as well as any information (e.g. functions) required for approval are not forwarded from one approver to the next. They are accessed from the general data base dynamically. This architecture enables updating constantly the approval path to the company s personnel (users) moves or reassignments.

Figure 5:
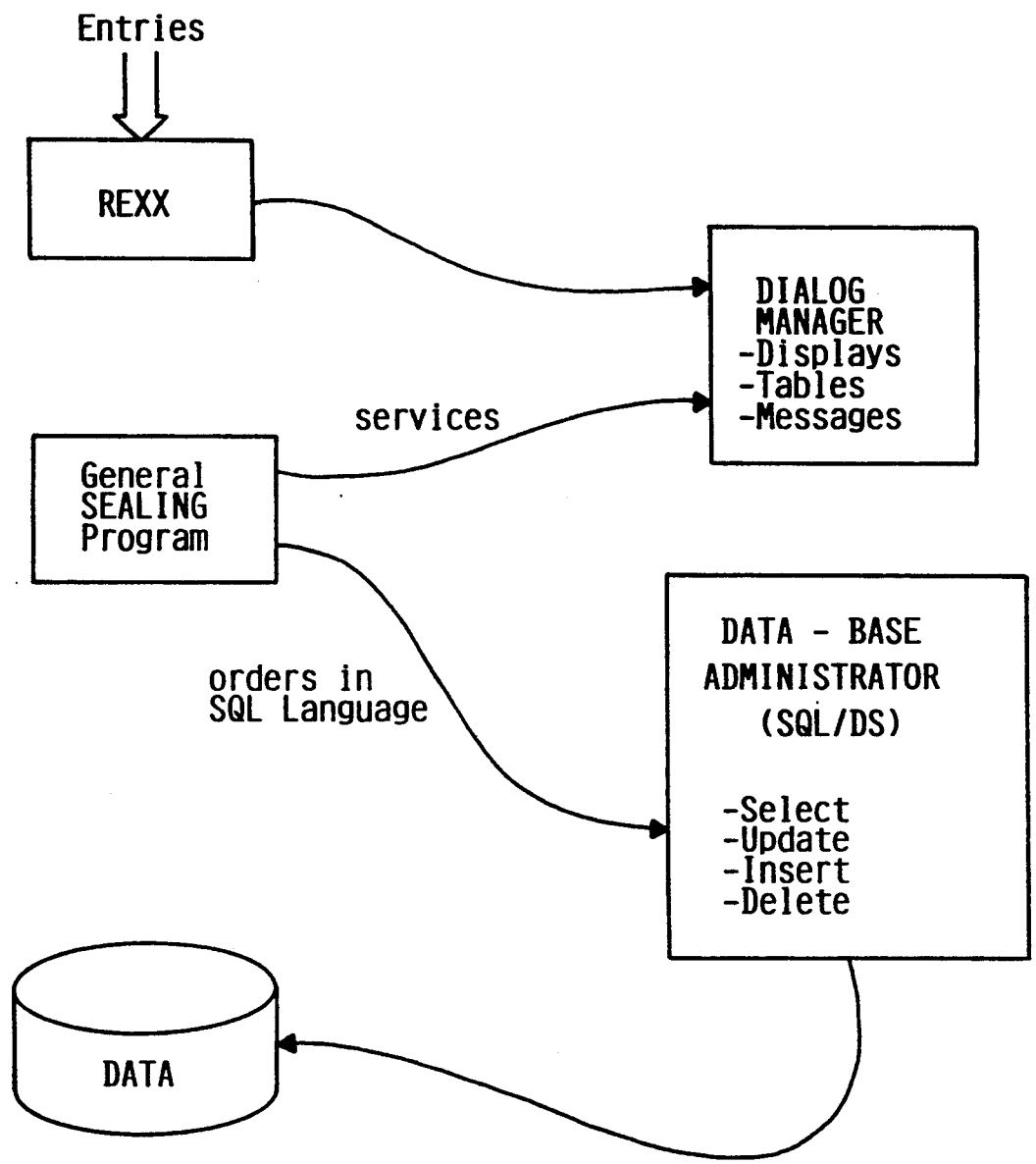
FIG. 5: a software architecture for the invention.

From a functional standpoint the software architecture is organized as represented in FIG. 5. In other words, access to the approval system is provided by software tools in REXX language. These tools (programs) will access the library of SEALING General Purpose Programs as well as access a Dialog Manager. The Dialog Manager in ISPF language controls the following functions: screen display on any users terminal; tables in memory; and messages generation. The dialog manager performs the tasks of a user interface. For reference on ISPF one may refer to the IBM brochure ISPF Version 2 Dialog Management Services SC34-2173. Accesses to said dialog manager are performed by the entry REXX unit and by the general purpose program unit. A Data Base Administrator is provided which contains SQL/DS tools to select; update; insert or delete data from a DATA BASE stored on disks. Said Data Base Administrator is accessed by the General Programs using SQL orders. For SQL, one may refer to:

SQL/Data System General Information GH24-5064
SQL/Data System Terminal User's Guide SH24-5045

Figure 6:
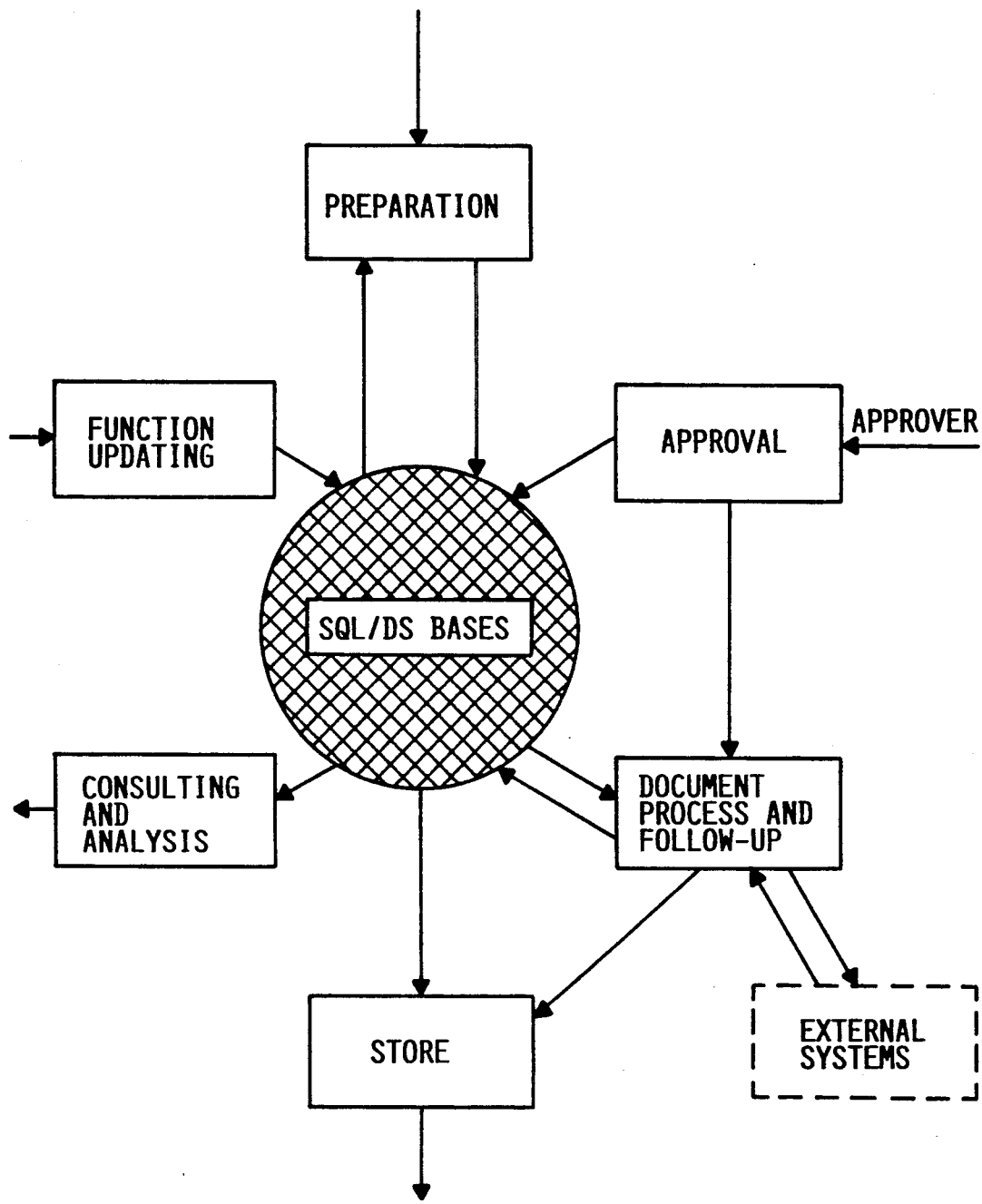
FIG. 6: a symbolic representation of the invention.

Represented in FIG. 6 is a symbolic representation of the approval system centered on an SQL/DS data base accessible on Read/Write basis throughout the process. An entry for a document preparation (as will be explained later) involves read/write operations into the data base. This process step is followed by an approval step which can be triggered from both the document preparing user or directly from an approver. Once approved the document is further processed, followed-up and executed as needed. For that purpose not only the SQL/DS needs be accessed, but external systems too, like, for instance VM directories otherwise available. The document is finally forwarded to storage. Also available are means for updating "function" data particularly useful to the approval process; and consulting/analysis means to be used for instance for performing statistical operations.

Represented in FIG. 7, is a mapping of the system data to be stored into the data disks of the SQL oriented data base of SEALDBA machine.

System data can be split into general tables required to run the system and specific tables which are accessed and/or generated when needed by the approval process. Obviously, the contents of said tables are based on preselected approval criteria which could be changed and therefore are not limitative. The following description is made with reference to criteria implemented in the preferred embodiment.

(A) In General Tables, one can find:
1. The LOGON tables including users identification data. (e.g. nodeid; userid).
2. Tables related to FUNCTIONS: it is herein assumed that the approval system users are assigned specific functions governing the approval rules (e.g. managerial organization). Said tables include:
   FUNCTION tables defining existing functions and providing for each function an acting person and a titular person identification.
   PREVIDEL tables registering previsions of delegations, assuming approval competence could be delegated from one person to another.
   HISTFUNC keeps track of any modification occurring in function tables for audit purposes (new function, delegation, change of titular).
3. Tables related to APPROVAL process: APPFUTU, APPWAIT and APPDONE relate to documents in progress.
   APPFUTU contains for each document the functions to be involved (in the future) in the approval process.
   APPWAIT contains for each document the functions awaiting for an action on the document.
   APPDONE contains for each document the functions having already acted on the document, the decisions and identification of the person(s) who acted and the titular if different.
APPHIST deals with documents which are no more in progress. i.e. they have been finalized, rejected or cancelled. It has exactly the same structure as APPDONE.
4. Tables related to DOCUMENTS:
   Filled-in forms provide so called documents to be subjected to the approval process. Each document includes at least a HEADER with the data defining the document. All headers are dynamically stored into HEADERS tables.

COMMENTS Tables contain for each document the comments added by the approvers during the approval process as they act on the document.

(B) In the specific Tables, one can find:
1. Tables dealing with FUNCTIONS:
   determination of function table coded FafuncDn; characteristic of function table coded FafuncCn. (func is a code for type of function and n in Cn and Dn is an integer sequence number).
2. Tables on DOCUMENTS: Typdocàn represents for a given form (or type of document/typdoc) a set of n tables needed to contain the specific document data.

Control tables are sometimes necessary to control the data entered to prepare a document or to modify these data during approval process. Once defined and updated, they can be used for several different types of documents.

Follow-up tables are sometimes necessary to give follow-up information on definitely approved documents.

An example of Function Table is represented hereunder:

Purchaser (PURC)

......

a reference of function (Reffun): coded with six characters
Managed department number for Managers
Code for Financial Analyst
Code for Purchaser

......

When a function is unique, reference is not necessary. For example, the function "Plans & Controls" is unique.

The function "employee" is a basic function meaning being one of the company's employees. Its reference can be the serial number assigned to the individual at hiring.

The type of function has been codified with 4 characters:
INDI is for "Employee"
MANA is for "Manager"
PURC is for "Purchaser"
CTLG is for "Controller"
ISPC is for "Plans and Controls" . . .

Userid and nodeid identify a VM machine and consequently a unique person.

"TITULAR" designates the owner. i.e. the person who is assigned the function while "ACTING" is used to designate the person actually doing the job presently.

FUNCTION TABLE

| | Function | | Acting | | Titular | | Last | Delegation |
|---|---|---|---|---|---|---|---|---|
| | Type (Typfun) | Reference (Refun) | Userid | Node | Userid | Node | update | Index |
| 1 | INDI | 079954 | MARTINS | LGEVM2 | MARTINS | LGEVM2 | 880513 | |
| 2 | INDI | 071328 | DAVIS | LGEVM2 | DAVIES | LGEVM2 | 880622 | |
| 3 | INDI | 055413 | HACKERS | LGEVM2 | HACKERS | LGEVM2 | 881130 | |
| 4 | MANA | 0793 | MARTINS | LGEVM2 | MARTINS | LGEVM2 | 880524 | |
| 5 | MANA | 0830 | MARTINS | LGEVM2 | DAVIES | LGEVM2 | 880515 | D |
| 6 | ISPC | | JOHNSON | LGEVM2 | DAVIES | LGEVM2 | 880318 | D |
| 7 | PURC | 45 | HACKERS | LGEVM2 | HACKERS | LGEVM2 | 880513 | |
| 8 | INDI | 022007 | | | ROOVER | LGEVM2 | 880913 | |
| 9 | MANA | 0750 | | | ROOVER | LGEVM2 | 881213 | |
| 10 | MANA | 1000 | ANDERSON | LGEVM2 | SCHMIDT | DCTVM1 | 881024 | S |
| 11 | INDI | 045345 | ANDERSON | LGEVM2 | ANDERSON | LGEVM2 | 881012 | |
| 12 | INDI | 087632 | JONHSON | LGEVM2 | JOHNSON | LGEVM2 | 881103 | |

An important concept of the system is the concept of "function". In a company or any group of people within which the approval system is needed to operate, prerogatives. e.g. approval competence, are assigned based on job assignments or title, herein referred to as "Function".

In an approval process, it is not the signature of a specific person which is required, but the signature of the person presently assigned the required function.

A function can be defined as a sum of prerogatives acknowledged by the company and assigned to a person. Conversely, a given person may have several different functions.

The approval system of this invention considers functions assigned rather than people. There are a lot of advantages to use this criterium because functions are generally more stable that people. For instance, approval rules defined in a company are generally related to people's level within the company (hierarchy).

In the system, a "function" is completely defined by:
a type of function (Typfun): herein coded with four characters
Manager (MANA)
Budget Controller
Financial Analyst For instance MARTINS is the employee whose reference number (Reffun) is 079954 (line 1). He is also manager of the department number 0793 (line 4). He is acting as manager of department 0830 by delegation of DAVIES (line 5) who is employee number 071328 (line 2).

HACKERS is employee number 055413 (line 3) and also Purchaser code 45 (line 7).

DAVIES has delegated his function of manager to another manager. MARTINS, as seen before, but he has delegated his function of Plans and Controls to JOHNSON who is not manager (line 6).

ROOVER (line 8 and 9) is absent (and nobody is acting for him).

SCHMIDT is not on the same node and has no electronic signature system, so ANDERSON is in charge of entering his decision in the system. He acts as "substitute" for SCHMIDT (delegation index is S).

Some functions are already managed in specialized systems attached to the network. In that case, a link to the specialized system will enable getting rid of the hassle of the Function Table maintenance. For instance in a Company, a Personnel Department System provides indications of titular for the following functions: employee (referenced by his employee Serial number- )—department manager (referenced by managed department number)

The system provides an interactive means to manage any other function, as soon as this function becomes necessary in an approval process.

Examples of APPROVAL TABLES of FIG. 4 are represented hereunder.

datory, any approver can suppress it, but if it is mandatory, either it is not possible to suppress it, or another function must replace it.

APPWAIT contains for each document in approval process the function(s) which are actually waiting for the document (i.e. next to act).

As APPFUTU, it contains document identification,

APPROVAL TABLES

APPFUTU:

| Document | | Function | | App. | Mand | |
|---|---|---|---|---|---|---|
| Type (Typedoc) | Refer. (Refdoc) | Type (Typfun) | Refer. (Reffun) | type (AppTyp) | tory (MCS) | Order |
| DAFONC | 0JA54 | MANA | 0798 | A | M | 1 |
| DAFONC | 0JA54 | MANA | 0792 | A | M | 2 |
| DAFONC | 0JA54 | CTLG | LGE | A | M | 3 |
| DAFONC | 0JA54 | PURC | 45 | R | M | 4 |
| DAFONC | 0JA54 | PURC | 74 | R | M | 4 |

APPWAIT:

| Document | | Function | | App. | Mand | Previous |
|---|---|---|---|---|---|---|
| Type (Typedoc) | Refer. (Refdoc) | Type (Typfun) | Refer. (Reffun) | type | tory | approver name |
| DAFONC | 0JA54 | MANA | 0793 | A | M | Johson, Alex |

| Comments for previous approver | In wait since | |
|---|---|---|
| | Date | Time |
| OK for me | 881023 | 153407 |

| Document | | Function | | App. | Mand | Deci | Acting | |
|---|---|---|---|---|---|---|---|---|
| Type | Refer. | Type | Refer. | type | tory | sion | Emp N° | Name |
| DAFONC | 0JA54 | MANA | 0732 | A | M | Y | 079954 | Schmidt, John |

| Titular | | Deleg | Action on | |
|---|---|---|---|---|
| Emp N° | Name | Index | Date | Time |
| 071328 | Davies, Philip | D | 881023 | 153207 |

APPHIST: same structure as APPDONE.

APPFUTU: contains for each document in the approval process the list of functions which will have to deal with the document later on.

In this table the document is uniquely identified by the type of document (typdoc), which is in fact the code for the form from which the document is derived and a reference (refdoc) within this type. In this application, one should remember that the expression "document" should normally mean a filled-in form, and that several prestored forms will be available.

The function is identified as mentioned previously in FUNCTION table by a type of function (Typfun) and a reference number (e.g. Service or Department number (Reffun)). An order number 1, 2, 3 . . . indicates which function(s) will need to approve next, assuming no changes to the approver list has occurred. Several functions can have the same order number.

Approver type (Apptyp) indicates if the function is in the list as an Authorizer (A) or as a Reviewer (R). The Authorizer actions could be "Authorize" or "Reject"; while a reviewer should "Approve" or "Disapprove".

An index indicates if the function is mandatory or not on the approver list. This will be important to make changes in the approver list. If the function is not manfunction identification, approver type and mandatory indicator. It contains also the previous approver's name, one line personal comments from the previous approver, the date and time of previous action.

APPDONE: contains for each document the functions that have already acted on the document, the decisions and identification of the persons who have acted and of the titular if he is different.

As APPFUTU and APPWAIT, it contains document identification, function identification, approver type and mandatory indicator. It contains also the decision of the approver: Y for Authorize or Approve; N for Reject or Disapprove, the identification of the approver, name and employee serial number, the identification of the titular of the function, name and employee number, the delegation indicator, the action date and time.

As already mentioned, the approval system for the best mode of this invention is made to use predesigned forms. Any user wishing to start a request for approval operation, will access a document form (blank)and fill-it in. A form includes predefined fields which, when filled-in will be stored into a set of tables including, among others, a table "HEADERS".

HEADERS

| Document | | Sta | | Originator | | | |
|---|---|---|---|---|---|---|---|
| Type | Refer. | tus | Flag | Type | Refer. | Emp no | Name |
| DAFONC | 0JA54 | P | N | INDI | 079954 | 079954 | Schmidt, John |

| | Created on | |
|---|---|---|
| Subject of the document | Date | Time |

| HEADERS | | |
|---|---|---|
| Bus transportation for kick-off meeting | 881023 | 153407 |

This table contains header data required for any document.

The key of this table is the document identification, i.e. type and reference of document. Each document is assigned a status (one character) which can be:
- P: document is in progress in approval process
- F: document is finalized, approval process is over.
- S: document has been sent to an operational system
- T: document has been transmitted for action (acknowledgement received from operational system).
- H: action involved is terminated
- R: document has been rejected by an Authorizer
- C: document has been cancelled by the Originator A flag is used to indicate that the corresponding document is currently being processed by someone. If the flag is set to Y (yes), the system bars someone else's access to the document.

The Originator is identified in HEADERS table by his function (e.g.: INDI for employee), his employee serial number and his name.

The table also contains the subject of the request submitted to approval (document) and the originating date and time.

In addition to the function tables already mentioned the system will use Specific Function Tables storing data to be used for defining the approval rules selected by the form user's company.

| SPECIFIC FUNCTION TABLES | | | | |
|---|---|---|---|---|
| DETERMINATION TABLE: (D) = FafuncDn wherein "func" is used to designate function type. | | | | |
| Key | | gives: | | |
| Parameter | | Reference of function | | |
| Example: FaMANAD1 | | | | |
| Project Number | | Responsible department (reference for Function Manager) | | |
| 4577310 | | 0793 | | |
| 4012306 | | 0755 | | |
| CHARACTERISTIC TABLE: (C) = FafuncCn | | | | |
| Key | | gives: | | |
| Reference of function | | Parameter(s) | | |
| Example: FaMANAC1 | | | | |
| Department of manager | Expense authorizations | | | |
| | Personal | General | Investment | Last update |
| 0793 | 10000 | 20000 | 15000 | 881022 |
| 0755 | 25000 | 50000 | 35000 | 871231 |

These tables allow retrieving a function reference from a parameter. They will be used during approver list determination.

The example shows so called Determination Tables useful to determine the manager who is responsible for a documented project.

Function CHARACTERISTIC tables enable determining parameters from the reference of a given type of function. They will be used during approver signature validation. In other words, these tables store predefined approval rules.

The example shows the amount of expenses authorized based on the considered manager's function and the company's selected rules setting expense thresholds.

Figure 8:
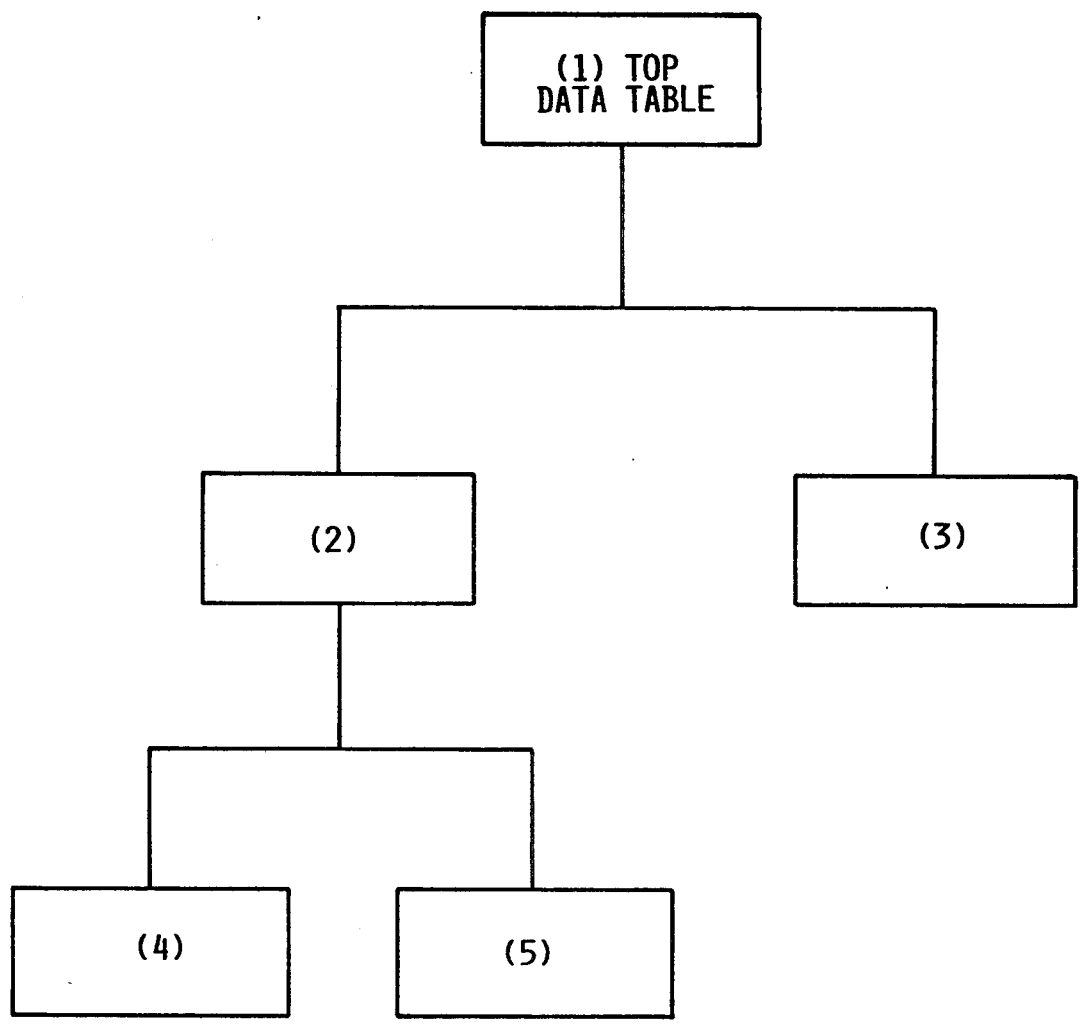
FIG. 8: a document structure.

From the above considerations, one may understand that any filled-in form (=document) contents is dynamically used by the system to determine the approval path when considered in combination with approval rules. In addition, the system is designed to enable adding or modifying forms, as needed, in a fairly simple way. Therefore, the various types of information fields contents should be organized to enable convenient processing of said fields. To that end, each field contents for all filled-in forms is stored in a document table, and these various tables are made to be related to each other according to a predefined tree structure (see FIG. 8).

If the form is simple, its data can be contained in one single table typdocà1 for the document (TOP) data table (NB: "typdoc" is used to designate document type and corresponding form code).

If the form is more complex, tables typdocà2, typdocà3, . . . , typdocàn can be defined to contain data which are dependent and have a variable number of occurrences. These tables will be related to each other according to the mentioned tree structure.

To illustrate the above, a specific example (General Expenses Purchase Request) is shown hereunder.

TABLE 1

| Header of Purchase Request | | | |
|---|---|---|---|
| Keys: | KEY1 | CHAR(5) | Reference of request |
| Non-key variables: | | | |
| | PROFI | CHAR(7) | Project to be charged |
| | MAUTO | DEC(11,0) | Maximum amount |

TABLE 2

| Items inside Purchase Request | | | |
|---|---|---|---|
| Keys: | KEY1 | CHAR(5) | Reference of Request |
| | KEY2 | SMALLIN | Item number |
| Non-key variables: | | | |
| | QTDEM | DEC(7) | Requested quantity |
| | FPUHT | DEC(9,2) | Estimated unit price |
| | DESC | CHAR(30) | Item main description |

TABLE 3

| Complementary description of an item | | | |
|---|---|---|---|
| Keys: | KEY1 | CHAR(5) | Reference of Request |
| | KEY2 | SMALLINT | Item number |
| | KEY3 | SMALLIN | Line number |
| Non-key variables: | | | |
| | DESCC | CHAR(30) | Complementary description line |

Figure 9:
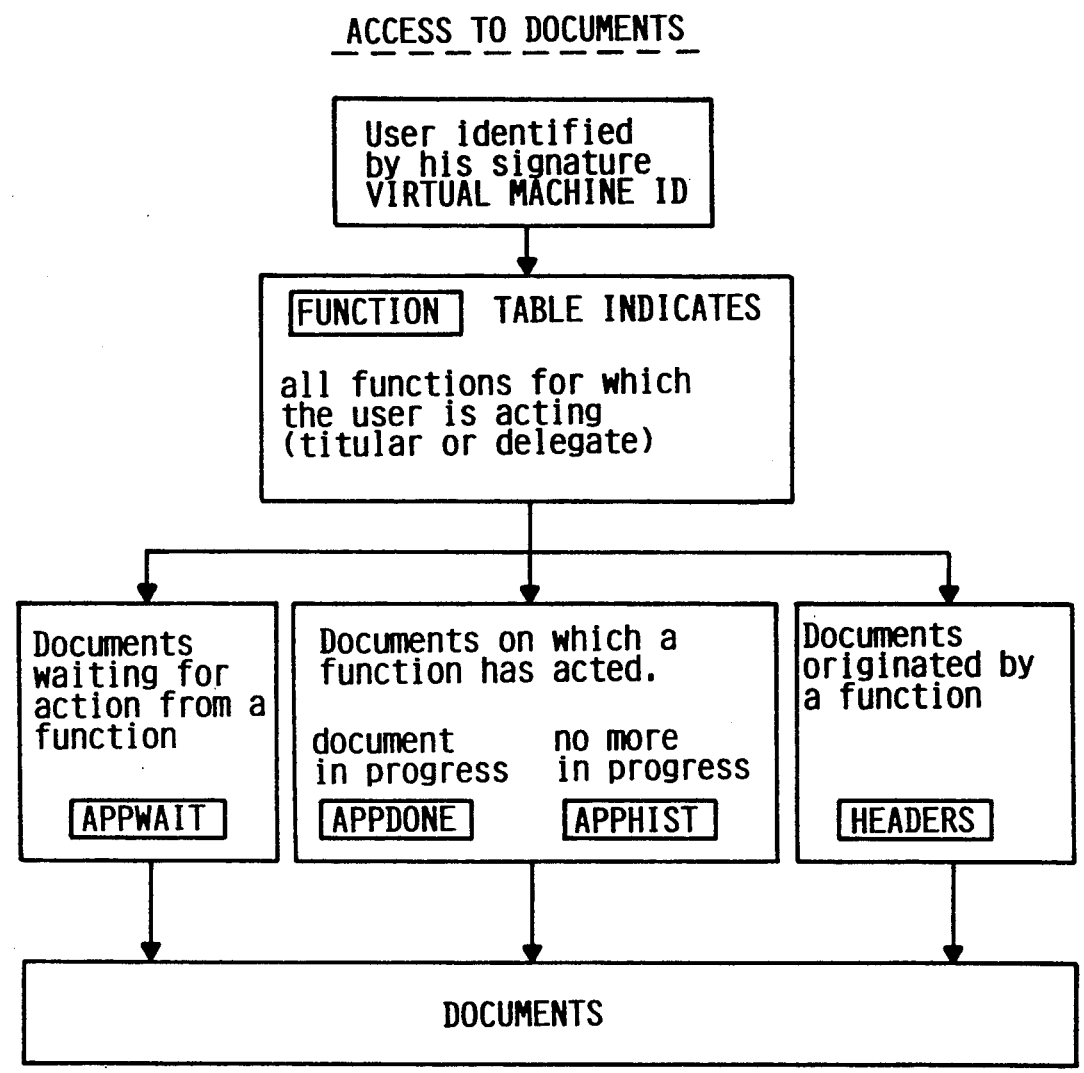
FIG. 9: a flow chard for accessing documents processed with the invention.

Having defined the system organization, one may now understand the principles used for any user's access to a document (see the flow chart of FIG. 9).

First, the user is recognized for being logged on a virtual machine which the system knows as a "signature" (approval) machine assigned to a registered user.

The FUNCTION table is the main filter to access the documents. Said table is permanently updated to reflect the actual function of all users attached to the network. Once authorized access by the filter, the table to be used by the system depends on what the user wants to do:

APPWAIT is used to determine the documents awaiting the action.

HEADERS is used to find documents origins.

APPDONE or APPHIST are used to find documents on which action has been taken already. Documents partially approved are stored in table APPDONE, while those approved by all required approvers (or rejected) are stored in an APPHIST or historic table.

To make the system attractive and end-user friendly from an operational standpoint, panels have been set and functional keys (PF keys) assigned specific tasks.

The system does not assume any level of technical knowledge or expertise. It does assume however that the user is somehow familiar with document processing tools presently available; e.g. IBM PROFS or a similar Office System. More generally speaking the system is menu driven as will be shown hereunder on implemented examples.

First, the system is accessible by typing a CMS command through the user's terminal (e.g. typing "SEALING"), which links the user's VM machine to the SEALSYST VM system-disk. Assuming the IBM PROFS system is available, then a PF key would have been customized for direct access to the system. In both instances, the system would load programs (EXECS or routines) for preparing, processing or consulting, etc. . . . documents, and presenting the following menu on the user's display.

| SEALING MAIN MENU |
| --- |
| Press one of the following PF keys |
| PF1  Prepare a document |
| PF2  Process documents awaiting your action |
| PF3  Consult documents you have originated or acted upon |
| PF5  Look at documents awaiting someone else's action |
| PF7  Delegate or retrieve your authority |
| PF8  Transfer or retrieve your VM Userid and Password. |
| PF9  Help     PF12  Return |

The user may select one of the options by depressing the PF key associated with said option. For example, to Prepare a Document, the user should press PF1.

He can also press PF9 to get a Help screen and that is the case for all the panels displayed in the system. PF12 enables quitting the system.

If the user presses an unused PF key, for instance PF4, an error message is displayed at the bottom of the screen, just above the PF keys description line.

Obviously the first operation a user needs performing is selecting a prestored form and filling said form in, to prepare a filled-in form, i.e. a document.

Depressing PF1 on menu 1 calls PREPARE EXEC. (See FIG. 10 for a high level flow chart of the process for preparing a document to be submitted to approval).

This EXEC starts displaying the list of forms available to the user in a "Choose a Form Category" menu. It should be noted that the system is made to process forms of various categories like "purchasing" orders (APPR), "financial" orders (FINA), requests for getting approval to tailor a VM Machine to a new user (LOGO), etc. . . .

| Choose a Form Category | |
| --- | --- |
| Press the PF Key for the Form Category you want to Choose. | |
| PF1  Purchasing forms | APPR |
| PF2  Logon request forms | LOGO |
| PF3  Financial forms | FINA |

| -continued |
| --- |
| Choose a Form Category |
| PF9  Help     PF10  Next     PF11  Previous     PF12  End |

If there are too many categories to fit on one screen, the user can scroll up and down using PF10 and PF11 respectively through the list to find the right category. Once a category is selected, a list of available forms within the category is displayed.

For example, if "Purchasing Form" has been chosen, the following "Choose a Form" menu is displayed.

| Choose a Form | |
| --- | --- |
| Press the PF key for the Form you want to choose. | |
| PF1  Basic Purchasing Request | DAFONC |
| PF2  Request for Price and Delay Quotation | DEMPED |
| PF4  Request Order | BORDRE |
| PF9  Help  PF10  Next  PF11  Previous  PF12  Return | |

The user may select the form which fits his present need. Help screens can be displayed at user's request and explain in which circumstances each form must be used.

Suppose the user presses PF1 on this menu. The menu below is then shown (assuming the requestor is the function owner and therefore his function has been allowed access to this kind of form).

| Prepare Main Menu |
| --- |
| Form title : Basic Purchasing Request |
| Press one of the following PF keys. |
| PF1  Prepare a document using a blank form |
| PF2  Change a Draft |
| PF3  Prepare a document using an existing Document |
| Type the reference ---------- of the existing document, then press PF3 key |
| PF9  Help     PF12  Return |

The user may select one out of three methods to prepare a document:

PF1 Prepare a document using a blank form. A predesigned form which includes input zones containing blank fields to be filled-in or already filled-in by "default" data which could be amended by the user at will.

PF2 Change a Draft. The user is shown a list of drafts of that form he has previously filled-in or just begun to fill-in and stored without sending as a document.

PF3 Prepare a document using an existing Document: the user has to type the reference of a document he is allowed to access and the system builds a new draft copying the data of this document. The system checks in this case that the reference exists in the data-base and that the user is either the originator, or one of the approvers. Thus filtering access to said existing document.

The layout of the screens which the user is presented with, depends on the original form designer's choices.

For example, if the form "General Expenses Purchase Request" has been chosen the screen below is shown.

| General Expenses Purchase Request (Header) |
| --- |
| Subject: Transport by bus |

| General Expenses Purchase Request (Header) | | | |
|---|---|---|---|
| Addressee: DUPONT | Department: 0693 | | |
| Confidential N (Y/N) Information: | PC parts or softwares: N (Y/N) New chemical product: N (Y/N) | | |
| Project to be charged: | 582310 | | |
| Maximum amount (FF): | 1000 Total: 1000 | | |
| Expiration date (DDMMYY): | ..... (optional) | | |
| Cmd = X (Select), D (Delete), A (Add), R (Repeat) | | | |
| PF8 Next PF7 Previous | | | |
| Cmd Item Description | Quantity | Unit price | Delivery week |
| - 1 transport by bus 40 places Vence-La Gaude on xx/xx/xx | 1 | 1000 | 22/88 |
| PF1 Search PF5 Submit PF9 Help PF10 Next PF12 File | | | |

The user can fill-in here the "header" part of the form.

All forms have a SUBJECT field. The "SEALING" system of this invention will use this field when showing the document on a list of documents. For instance when showing the list of documents awaiting someone's action.

Some data have already been filled-in (default) and can be modified:

The addressee (originator) and his department.

The flag "Confidential Information" indicates that confidential information are to be given to the supplier.

The flag "PC parts or softwares" indicates if the request contains such parts.

The flag "New chemical product" indicates if the request contains a new chemical product.

Some data are mandatory; like for instance the subject, and the project to be charged.

Some data are retrievable by the system for user's convenience. That might help for instance by enabling consulting the list of projects ran by the company's department the involved system user belongs to. Therefore, search is available for the project "field".

If the user sets the cursor on this filed and presses PF1, he will be asked for a department number and the system will display the list of projects for that department. The user can choose one of these and the field of the request will be automatically filled-in with the chosen project.

When the header is filled-in, the user has to fill the remaining items. He can press PF10 to get the item panel. When one or more items are entered, he will be able to select one item by typing X in front of it; or to repeat, delete or add a new item by typing R, D or A.

Depressing the ENTER key or any PF key, triggers a trivial data checking. If any checking fails, the required action is not performed, an error message is displayed, the cursor is positioned in the field in which error was detected and the field is highlighted in reverse video.

With the second screen (display upon depressing PF10), the user fills-in all the data for a particular item of the Purchase Request.

| General Expenses Purchase Request (Item) | |
|---|---|
| Subject : Transport by Bus | |
| Maximum amount (FF): | 10000 |
| Project to be charged: | 4577310 |
| Item number: | 1 PF3 Repeat Item PF4 Add an item |
| Price request reference: | .... Deliv. delay: weeks |
| Purchaser code: | 99 Purchaser name: Billiard, Jean |

| General Expenses Purchase Request (Item) | | | |
|---|---|---|---|
| Part number: | ........ | EC level: ...... | |
| Quantity: | 1 | Measurement unit: .... | |
| Delivery week (WWYY): | 22/88 | | |
| Unit price (FF): | 1000 (optional) | | |
| Item project: | ..... (if different from header) | | |
| Cmd = D (Delete), A (Add), R (Repeat) PF8 Next PF7 Previous | | | |
| Item Description: Transport by bus 40 places Vence-La Gaude on xx/xx/xx | | | |
| PF1 Search PF2 Header PF5 Submit PF11 Prev PF10 Next PF9 Help PF12 File | | | |

Some data are mandatory: e.g.: Purchaser code; Delivery week; Quantity; At least one line of description or a part number.

Some data are optional: e.g.: Price request reference; Part number; Item unit price; Measurement unit; EC (Engineering Change) level; Item project has to be filled only if it differs from header; and Complementary description lines.

Search procedures are available from this screen by putting the cursor in the selected field and pressing PF1; for price request reference; Purchaser code; part number; delivery week; or project.

The user can type several lines of complementary description for the item. A command area allows adding repeating or deleting lines. Scrolling is possible through PF7 and PF8.

Other PF keys are used:
PF2 Go to the header screen
PF3 Repeat the displayed item to create a new one
PF4 Add a blank item
PF5 All operations before sending in approval (see below)
PF10 Display next item if it exists
PF11 Display previous item if it exists If the user presses PF12, the system shows the screen below.

| Process The Document |
|---|
| Document : General Expenses Purchase Request |
| Reference: |
| Subject : Transport by bus |
| Press one of the following PF keys. |
| PF1 View the Document |
| PF2 Change the Document |
| PF4 Add comments |
| PF5 Review Approver List and Submit the Document for Approval |
| PF6 File the Draft in your Personal Storage for further changes |
| PF8 Print the Document |
| To erase the Draft, type DELETE below and Press ENTER → ...... |
| PF9 Help |

From here, the user will be able to:
PF1: View the document as it can be viewed later by all the approvers
PF2: Change the document data
PF4: Add free comments which will be viewed to all the approvers
PF5: Prepare sending in approval (see below)
PF6: Save the data entered as a draft document (and retrieve it later)
PF8: Print the document. A print image of the document is then added in a file called "print file". The user will be able to print this file at the end of the session type "DELETE" in the provided field to erase the in process draft Some of the above defined PF keys functions are self explanatory. Others need some explanations. For instance, by depressing the key PF4, the user gets the following items on his screen:

---
Add Personal Comments
---
Type : General Expenses Purchase Request
Reference: Draft
Subject : Transport by Bus
Comments :
* * * Top of File * * *
PF2 Add line PF3 Return PF8 Erase line PF10 Forward PF11 Backward PF12 File
→
                                                    Input-mode
1 File
---

Figure 10:
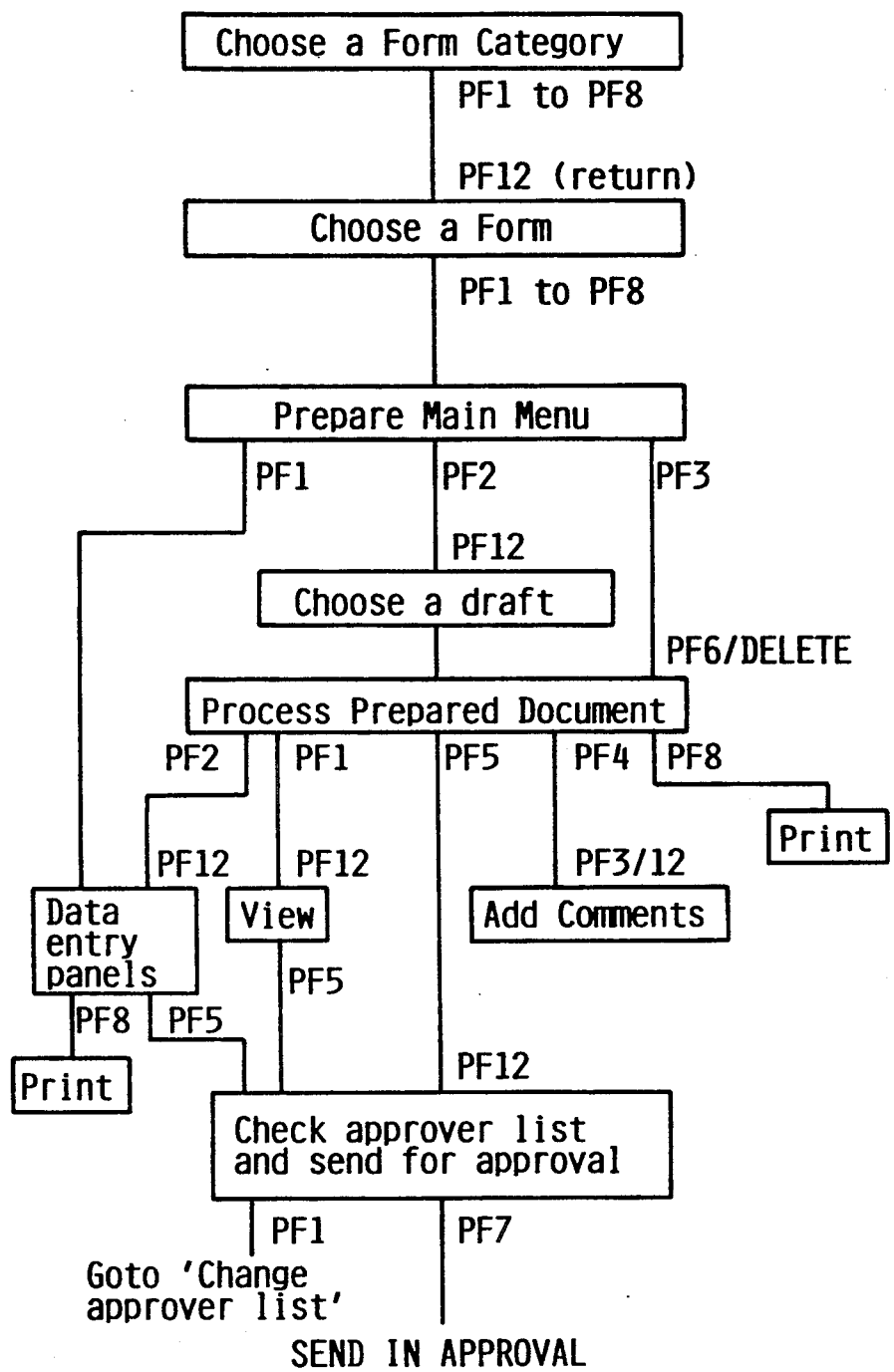
FIGS. 10–13: mesure oriented charts for operating the invention.

The user can type free comments and use PF keys as described hereafter:

PF2 to add a blank line below cursor position
PF3 to leave without saving last modifications
PF8 to delete the line where the cursor is
PF10 and PF11 to scroll forward and backward through the comments file
PF12 to save and leave comments entry The above operations are summarized in the self explanatory flow-chart of FIG. 10.

Down to this point the process lead to a fully prepared document ready for being submitted to the approval process. Therefore, if the user presses PF5 either from the data entry panels, or from the "Process prepared document", the system performs the following operations.

First, it checks all the document data (complete checking). If an error is found, the system displays again the data entry panel where the field bearing an erroneous data is indicated by the cursor. Then, it determines the approval path based on functions involved, specific rules assigned for the type of document involved, and document data (see FIG. 14).

If an error is found, the message "Unable to determine approval process" is displayed and no action is performed.

Finally, it determines for each function of the approval process, the acting person at the present time and the titular.

The result is displayed (see FIG. 15) to the considered user (originator) as shown hereunder for review.

---
Review Approver List And Submit For Approval
---
Document : General Expenses Purchase Request
Subject : Bus transport
PF1 Change Approver List
PF7 Submit the Document for Approval
Function description  Name              Approver Type Manager       0793    Martins, John     Authorizer
Purchaser     45      Hacklers, Jimmy   Reviewer
Approval process has been determined
PF9  Help  PF10 Next  PF11 Previous  PF12 Return
---

If the user presses PF12, he just returns to "Process the document" Menu.

Otherwise, by depressing PF1 he will be able to change the approver list with some controls and restrictions (see below with reference to FIGS. 15 and 16).

Figure 15:
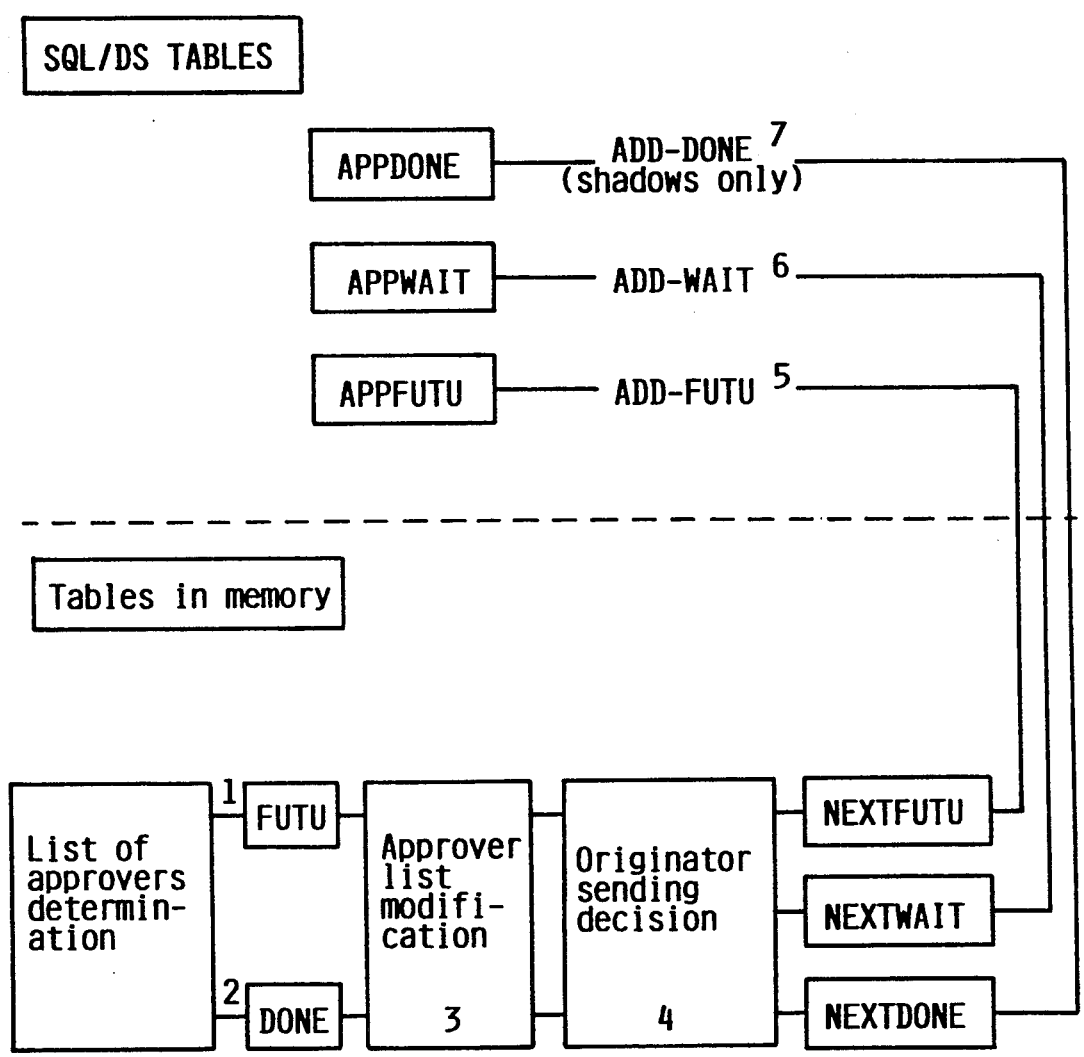
Figure 16:
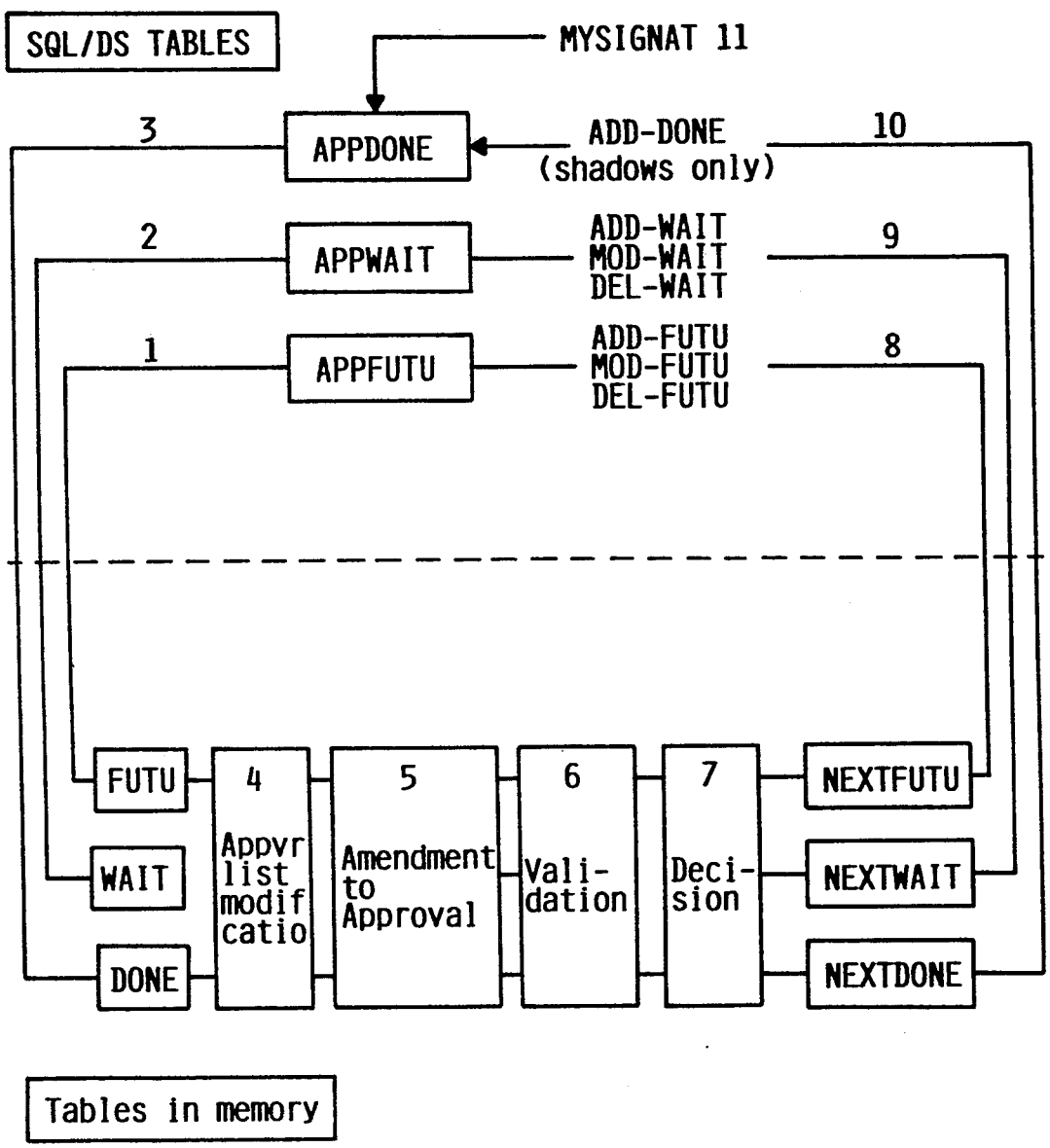

If he does press PF7, the document is created and waits for action of the first function (s) in the approval process (see FIGS. 15 and 16).

Figure 11:
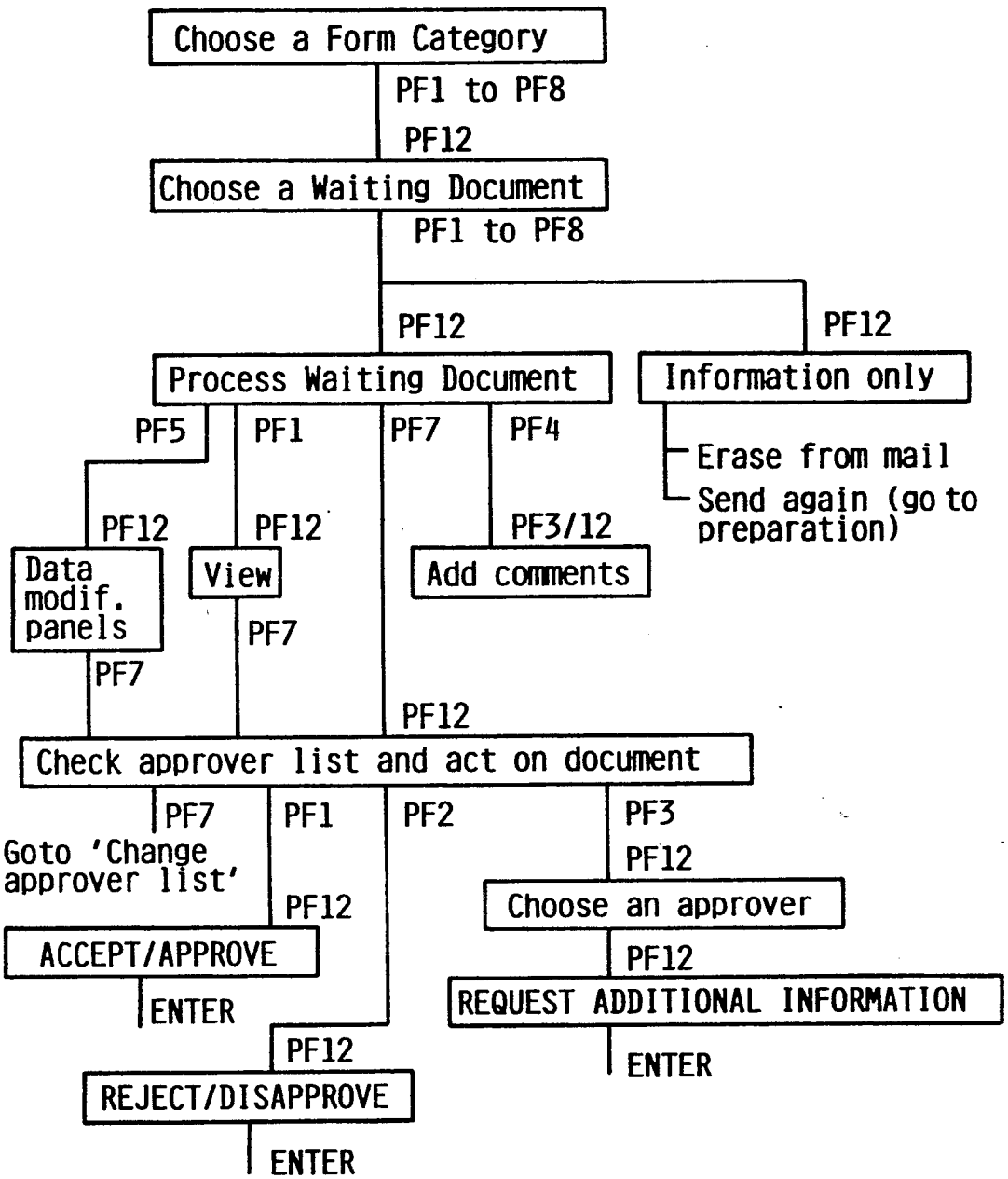

Represented in FIG. 11 is a flow-chart summarizing the operations achievable on an already filled-in document. The user can act on documents awaiting his action by pressing PF2 in SEALING Main Menu or directly typing SEALING ACT_ON as a command.

When SEALING has been linked with IBM PROFS application, the user gets a message when depressing the functional key labeled "Open the Mail", assuming SEALING documents are waiting action. The message looks like:

"You have 5 documents awaiting your action to Electronic Approval System. Do you wish to process these? Type Y and press ENTER if you wish". The system then shows first a list of categories of documents as shown below.

---
List of Documents
---
Press the PF Key for the Category of Document you want to process.
Title         Number of documents
PF1 Price and delay Request    2
PF2 General Expenses Purchase Request   8
PF9  Help  PF10  Next    PF11  Previous  PF12  Return
---

As represented in the flow chart of FIG. 11 the user has to select a category by pressing the appropriate PF key.

When the user has selected a category, the system displays the list of documents in the selected category. If there is only one category of documents, the first screen is by-passed.

---
List of documents awaiting your action
Form title : General Expenses Purchase Request
Press the PF Key of rht document you want to process.

|  | From | Philippe | Date | Reference | Required Action |
|---|---|---|---|---|---|
| PF1 Dupont, | Philippe Transport by Bus | | 880322 | JA022 | Review |
| PF2 Beraud, | Serge Safety Glasses | | 880314 | JA021 | Review |
| PF3 Dupont, | Philippe Tables for the Restaurant | | 880210 | JA015 | Review |
| PF4 Dupont, | Philippe Printing Cards | | 880210 | JA012 | Inform |

PF9  Help  PF10  Next    PF11  Previous  PF12  Return
---

The documents list is sorted by date of required action, the more recent are at the top of the list. Eventually scrolling additional screens may be needed. The user can scroll up and down using PF10 and PF11 respectively.

Then selecting one document is achieved by pressing the corresponding PF Key (PF1 to PF8) which displays the following screen.

---
Process a Document awaiting your Action
---
Document   :   General Expenses Purchase Request
               Number JA022
Originator :   Dupont, Philippe      0793

-continued

| Process a Document awaiting your Action |
|---|
| Subject : Transport by Bus |
| Your Function is : Manager  0793 |
| Press one of the following PF Keys. |
| PF1  View The Document |
| PF4  Add Comments |
| PF5  Add or Modify Data |
| PF7  Act on the Document |
| PF8  Print the Document |
| Previous Approver was : Schmidt, Jimmy |
| Personnal Comment from previous Approver: |
| OK for me. |
| PF9  Help  PF12  Return |

The user can see on this screen the document type and reference, the subject, the originator's name, who was the l last previous approver and personal comments from this previous approver. Also mentioned is the function the present user is asked to act for, and eventually the owner for the function if the user is a delegate.

By depressing PF1, the user can view all information about the document, i.e. the document itself; the approver list with decisions of approvers who have already acted on the document; the document originator and approvers comments, if any.

Depressing PF4, enables the user adding his own comments to the other approver's comments after acting on the document.

PF5 is not available for all approvers. This PF Key is only active if the document is originally tailored to authorize the function to add or modify data. In this case, the user is shown data modification panels and can add or modify data in the document. These modifications can affect the approval path process.

PF7 must be used to act on the document.

If the user is an Authorizer, he will see the screen below.

| Act on the Document |
|---|
| Document  :  General Expenses Purchase Request JA022 |
| Originator  :  Anderson, Philip  0793 |
| Subject  :  Transport by Bus |
| Function  :  Manager  0792 |
| Press one of the following PF keys. |
| PF1  Authorize |
| PF2  Reject |
| PF3  Request for Additional Information without taking a Decision |
| PF7  Change the Approver List |
| PF9  Help  PF12  Return |

The user can change the approvers list by pressing PF7 (seen later).

The user can Authorize (Approve) the document with PF1. The system will display a confirmation panel which looks as follows.

| Confirm your Authorization |
|---|
| Document  :  General Expenses Purchase Request JA022 |
| Originator  :  Anderson, Philip  0793 |
| Subject  :  Transport by Bus |
| Function  :  Manager  0792 |
| Press ENTER to confirm your approbation. |
| Warning :  After confirmation you will not be able to change your decision. |
| You can enter a Personal Comment: |
| For the next approver(s): |
| Manager  0792  Schmidt, John Delegate of Anderson, David |

| Confirm your Authorization |
|---|
| PF9  Help  PF12  Return |

The next screen shows the next approver and allows the user to type one line of personal comments for said next approver's attention.

If the user is the last approver, the confirmation panel is different and looks as follows:

| Confirm your authorization |
|---|
| Document  :  General Expenses Purchase Request JA022 |
| Originator  :  Anderson, Philip  0793 |
| Subject  :  Transport by Bus |
| Function  :  Manager  0792 |
| You are the last approver. This document will be finalized. |
| Press ENTER to confirm your approbation. |
| PF9  Help  PF12  Return |

Authorization means finalization of the document.

An Authorizer can also Reject the document. The system will display a confirmation panel which looks as follows.

| Confirm your reject |
|---|
| Document  :  General Expenses Purchase Request JA022 |
| Originator  :  Anderson, Philip  0793 |
| Subject  :  Transport by Bus |
| Function  :  Manager  0792 |
| Press ENTER to Confirm your Reject. |
| Warning :  After confirmation you will not be able to change your decision. |
| You can type below a Personal Comment for approvers and originator MYREMK |
| Information will be sent to approvers who have already viewed this document |
| Manager  0793  Martins, John |
| PF9  Help  PF12  Return |

The system asks the user to confirm his decision, indicating that in case of non-confirmation, the document will be rejected, an information will be sent to the originator and to each approver who has already acted on the document.

The user may also choose PF3 to request additional information from another approver.

In this case, the user has to choose an approver in the screen below.

| Request for Additional Information |
|---|
| Document  :  General Expenses Purchase Request JA022 |
| Originator  :  Anderson, Philip  0793 |
| Subject  :  Transport by Bus |
| Function  :  Manager  0792 |
| To request for additional information, choose an approver and type an X next to your choice below. |
| When you have made your choice on this screen, press ENTER. |
| Function  Description  Name |
| Originator  079954  Jacobson, Steve |
| Manager  0792  Martin, John |
| Purchaser  45  Tucson, Joe |
| PF9  Help  PF10  Next  PF11  Previous  PF12  Return |

He can choose the originator, an approver who has already acted on the document or an approver who has not yet seen the document, then he gets a confirmation panel as below.

If the document has been received for information only, the user is shown the following screen.

```
------ Document received for Information only ------
Document    : Genera Expense Purchase Request    Number : JA022
Originator  : Anderson, Philip   0793
Subject     : Transport by Bus
Your Function is : Manager    0792
Press one of the following PF Keys.
PF1   View the Document
PF4   Erase the Document from your incoming mail and keep in your mail log
PF5   Modify and Send again for approval
PF8   Print the Document
Previous Approver was : Durand, Andre
                                        Personnal Comment from previous Approver :
         PF9   Help      PF12   Return
```

```
              Confirm your request for additional information
Document     :   General Expenses Purchase Request JA022
Originator   :   Anderson, Philip    0793
Subject      :   Transport by Bus
Function     :   Manager    0792
Press ENTER to Confirm your Choice, and the Document
will be sent
to the Manager           0793          Schmidt, John
PF9    Help  PF12   Return
```

If the user confirms, the document is available for the chosen approver and the user will get it back again after this approver has acted upon said document. If the user is a Reviewer in the approval process, he is shown the following screen.

```
                    Act on the Document
Document     :   General Expenses Purchase Request JA022
Originator   :   Anderson, Philip    0793
Subject      :   Transport by Bus
Function     :   Manager    0792
Press one of the following PF keys.
PF1    Approve
PF2    Disapprove
PF3    Request for Additional Information without taking
       a Decision
PF7    Change the Approver List
PF9    Help  PF12   Return
```

There will be two different confirmation panels no matter whether the user is the last approver or not. Request for additional information operation is quite the same as requested to an Authorizer. It should be remembered that a Reviewer cannot reject a document. He can just disapprove the document, in which case a further Authorizer approval is required. The system determines if there is an authorizer in the list of next approvers. If there is no Authorizer in the list of next approvers, the system asks the user to choose among the Authorizers who have already acted on the document and will send the document back to the chosen Authorizer who will have to confirm this previous authorization or to reject the document.

The user can receive such information in several instances. He may be the originator and the document has been a a a accepted. Action is therefore currently in process for execution. Or the document has been rejected by an Authorizer or has been cancelled by the originator and the user is either the Originator or an Approver who has already acted on it.

PF4 has just the effect to cancel reference reminder to said documents. The user can always access the document using consultation facilities.

PF5 is available on this screen only if the document was rejected. It enables the originator retrieving all the document data, a correct something, and send again very quickly (with a new reference) if he wants.

Obviously, any user should be able to consult documents he has originated or acted upon, by pressing PF3 in the Main Menu or directly typing SEALING CONSULT as a command.

The menu below is then shown to the user.

```
----- Consult Documents you have originated or acted upon -----
Press one of the following PF Keys.
PF1    List Documents in approval process you have originated
PF2    List Documents in approval process you have acted upon
PF3    List Documents you have originated between 880301 and 880314
PF4    List Documents you have acted upon between 880301 and 880314
PF5    List Documents with search information specific to a form
         PF9   Help      PF12   Return
```

The user can access documents using several alternatives (see FIG. 12):

PF1: Lets the user access the documents he has originated and which are currently in the approval process.

NB: by user one means the person assigned corresponding function.

PF2: Lets the user access the documents he has processed and which are currently in the approval process.

PF3: Lets the user access all the documents, whatever their status (in progress, finalized, rejected, cancelled . . .) he has originated between two dates the user can modify.

PF4: Lets the user access all the documents (whatever be their status), he has acted upon between two dates the user can modify.

PF5: Lets the user access documents issued with criteria specific to a form.

Whatever the PF key chosen, the result will be either the message "no document found", or a list of documents found as shown hereafter:

If the user chooses PF1 to PF4, a list of found form categories is displayed whenever more than one category has been used, otherwise the "List of Documents Found" is displayed.

```
--------------- List of Documents found ---------------
Type : General Expenses Purchase Request
Press the PF Key for the Document you want to consult.
     Subject                         Number        Status
PF1  Transport by Bus                JA022         In Progress
     You have acted as:   IBM employee    079954   on 880314
PF2  Flowers buy                     JA021         In Progress
     You have acted as:   IBM employee    079954   on 880312
PF3  Car maintenance                 JA020         Finalized
     You have acted as:   Manager           0793   on 880312
PF4  Protection glasses              JA019         Rejected
     You have acted as:   IBM employee    079954   on 880312
PF5  Repaint                         JA018         Finalized
     You have acted as:   Controller         LGE   on 880312
PF6  Garden maintenance              JA014         Executing
     You have acted as:   IBM employee    079954   on 880305
PF7  Request for Writing Assistant   JA012         Rejected
     You have acted as:   IBM employee    079954   on 880304
PF8  Electronic components           JA011         Executed
     You have acted as:   IBM employee    079954   on 880304
     PF9 Help    PF10 Next    PF11 Previous    PF12 Return
```

If there are more than 8 documents found, the user can scroll through the list using PF10 and PF11. For each document found, the information displayed include: subject, status, function for which the user can access the document, date of action.

If the user chooses PF5, he will first have to make a choice among categories prior to accessing forms within a category. A criteria entry panel is displayed requesting additional precisions on the query. Suppose the user has chosen General Expenses Purchase Request, the following Screen is then presented:

```
--------------- Enter search criteria ---------------
Type : General Expenses Purchase Request
Reference : .....
Dates between : 880301 and 880314
Amount between : ........... and ...........
Project to be charged : .......
Subject contains : ...............................
PF9   Help          PF12   Return
```

The user has to enter the criteria for searching. If he leaves a blank, the system interprets as the largest query, e.g. if amount is not filled-in, the system searches from 0 to 9. The system begins searching when the user presses enter key.

When the user has selected a document, the screen displayed depends on the document status.

If the status is "In progress", the user is presented with the screen below.

```
--------------- Process the Document Found ---------------
Document   : General Expenses Purchase Request JA022 In progress
Originator : Anderson, Philip   0793
Subject    : Transport by bus
Press one of the following PF Keys.
PF1  View the Document
PF5  Copy the Document and create a Draft
PF6  Cancel the Document
PF7  Change Approver List
PF8  Print the Document
PF9  Help    PF12  Return
```

The user can view the document (data, approvers list and comments).
copy the document to create a draft
print the document If he is the originator, he can also cancel the document. In this case, the user is presented the following confirmation panel.

```
--------------- Confirm your canceling ---------------
Document   : General Expenses Purchase Request JA022 In progress
Originator : Anderson, Philip   0793
Subject    : Transport by bus
Confirmation will be requested and other approvers advised
PF9   Help        PF12   Return
```

Pressing PF7 in "Process the document found" menu allows the originator or an approver who has already acted on the document to change the approver list as he could have done when originating the document or acting upon the document.

When changes are prepared, the system displays the following panels.

```
--------------- Resend after changing approver list ---------------
Document   : General Expenses Purchase Request JA022 In progress
Originator : Anderson, Philip   0793
Subject    : Transport by bus
PF1  Resend
PF7  Change approver list
PF9     Help          PF12    Return
```

If all changes are correct, the user can press PF1 and the document proceeds with the new approver list.
PF12 will cancel all the changes.
If the status of the document is not "In progress", the available actions are different as shown hereafter.

```
--------------- Process the Document Found ---------------
Document   : General Expenses Purchase Request JA022 Executing
Originator : Anderson, Philip   0793
Subject    : Car transportation
Press one of the following PF Keys.
PF1  View the Document
PF4  View the Document Follow-Up
PF5  Copy the Document and create a Draft
PF8  Print the Document
    PF9     Help          PF12    Return
```

The user can view the document (data, approver list and comments).
copy the document to create a draft
print the document Follow-up information may also be given when the user presses PF4. These information indicate what action are being taken by the person who has to process the document. For example, for a purchase request, the system will keep track and report for orders sent to the suppliers, indicate the supplier delivery date, the quantity already received, etc. . .

Figure 12:
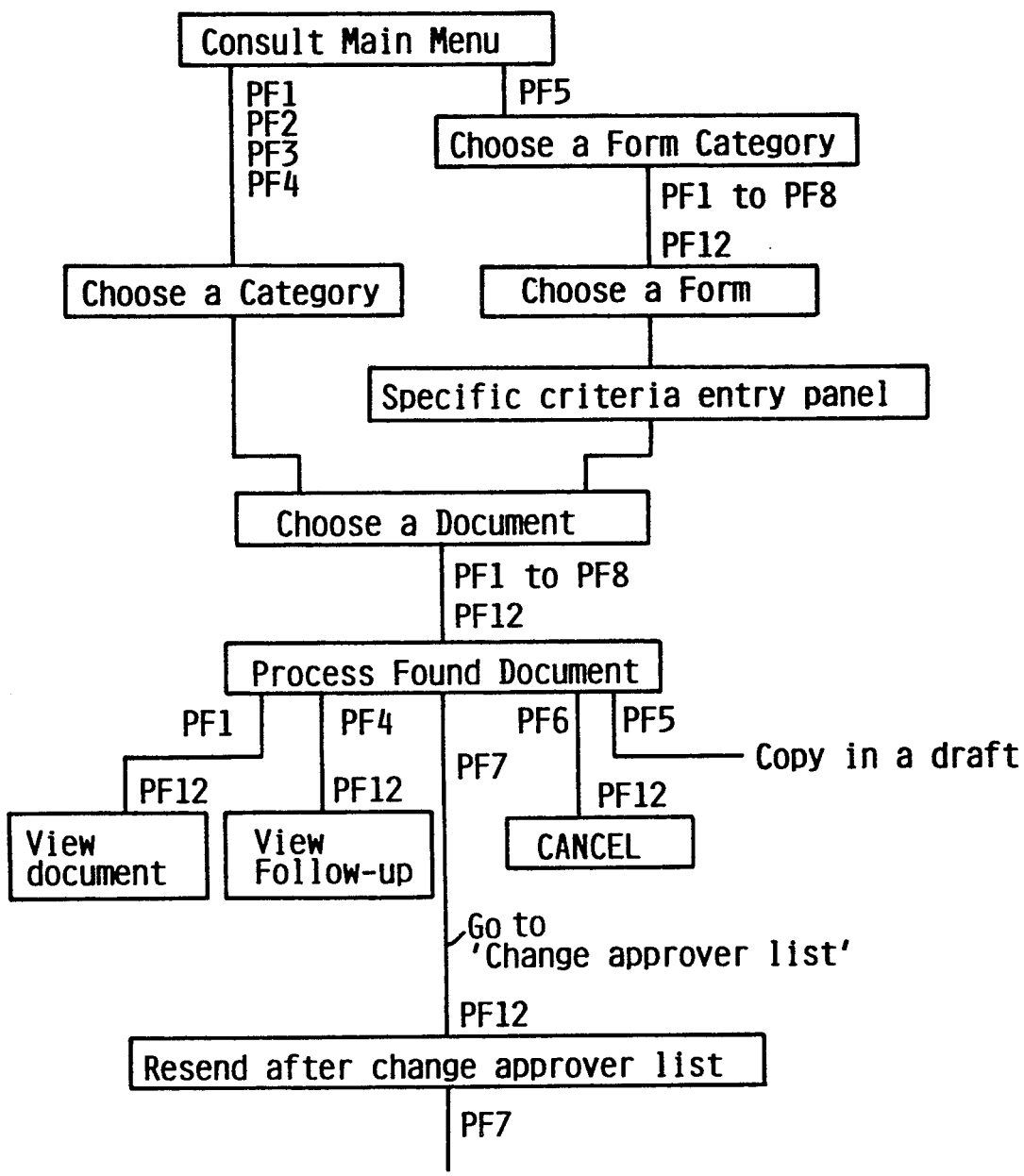

All above disclosed consulting operations are summarized in the self explanatory flow chart of FIG. 12.

Any user can access the list of documents awaiting someone else's action by pressing PF5 on SEALING Main Ment. The following is then displayed.

```
------ Look s someone else's document ------
Enter or modify the userid and node (if different from this node)
Press Enter to validate.
Userid : DUPONT--   Node : LGEVM2--   Name : Dupont, Philippe
Type of Document               Reference of document
General Expenses Purchase Request   JA079
General Expenses Purchase Request   JA092
Travel Request      T56435
General Expenses Purchase Request   JB435
ENTER           PF10   Next          PF11   Previous    PF12   Return
```

The user has to fill in the userid field and press enter. If userid is not known, an error message is displayed. If t t the userid is known, the system looks for documents awaiting action and give the references. For obvious security purposes, no further information about document can be obtained.

As already mentioned an approver designation, could be delegated from one user to another under predefined conditions. The user can access this part of the system by pressing PF7 on the SEALING Main Menu or directly typing SEALING DELEGATE as a command.

He is shown the screen below.

```
------ Delegate or Retrieve Approval Authority ------
For entering or modifying the userid and node (if different
from this node) of the person you wish to delegate your authority to.
Enter your own userid and node to retrieve your function.
Press Enter to validate.
Function Manager               0792
Userid : VOIRON--   node : LGEVM2--   name : Voiron, Jean
    Function IBM Employee      025654
Userid : MARIN--   node : LGEVM2--    name : Marin, Pierre
PF1 Search PF5 Previsions PF9 Help PF10 Next PF11 Previous PF12 Return
```

The screen contains the list or functions said user is titular for, presently. The userid which is indicated for each function is the userid of the person who is actually acting for this function. One can change this userid, either to indicate a delegation or to put his own userid and retrieve his authority.

For certain functions, delegation may not be allowed. The user cannot use this screen to delegate. He has to ask the function responsible (e.g. Financial Department) to register the delegation. However, the user can retrieve his authority for any function.

It is also possible to blank the userid field. In this case, the system considers the user as absent. This feature will be used to bar access to the document for instance when an approver is acting on it. So, originators and approvers will be informed and will be able to react to this situation.

To validate his entries, the user has to press the enter key.

Using PF1 allows the user to search for the userid of someone whom he knows only by his name or nickname. The user can press PF5 to enter delegation previsions. He is shown the screen in which he can type prevision dates for his delegations.

Figure 13:
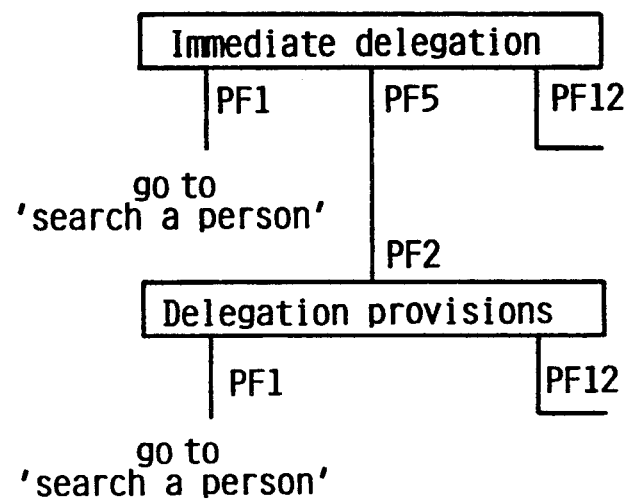

In this case, the delegation is not activated immediately, but will be automatically set by the system at the selected date. The above described delegation process is summarized in the flow chart of FIG. 13.

In a large company environment, temporary general machine delegation may be required for replacing someone absent for vacation or for any other reasons. Under these circumstances stored data and any information belonging to one user need be transferred to another user (assignee). This is achieved, in VM environment, by transferring a VM machine from one individual to another. Under these circumstances however the signature delegation should barred unless formally requested.

The user can access this application by pressing PF8 in the SEALING Main Menu or directly typing SEALING EASPRET as a command. The following screen is then presented.

```
------ Transfer your VM machine ------
Transferred VM :      Userid . . . .         VOIRON
                      Owner . . . . .         Voiron, Jean
                      Serial number .         025456
                      Department . .          0650
Assign to :
Type his serial number . ------ or Press PF1 to search by name.
Press ENTER to validate        PF12   Return
```

The user has to fill-in the serial number of the receiving person (assignee). If needed, PF1 may provide help. When a right identification of the receiving person has been given, the screen below is displayed.

```
------ Transfer your VM Userid and Password ------
Transferred VM Userid :   Userid . . . .      VOIRON
                          Owner . . . . .     Voiron, Jean
                          Serial number .     025456
                          Department . . .    0650
Receiving person :        Serial number .     079954
```

-continued

```
                        Owner . . . . .    MILON
                        Department . . .   0790
Reason for transfer . . . . . . . . absent from 9/06/88 to 16/06/88
Indicate a protection code which will be asked when retrieving
your VM machine (It will not appear when typed)
Type it twice for control :        →
                                   →
PF9    Help       PF12   Return
```

The user can see the complete identification of the chosen person. He can type an optional comment and he has to type twice a protection code which does not appear when typed. This code will be required for canceling the machine transfer.

The screen below is shown to the user when he pressed PF8 on SEALING Main Menu or typed SEALING EASPRET on the command line and when the VM has previously been declared as transferred.

```
                ---------- Retrieve your VM Userid ----------
Transferred VM Userid :    Userid . . . .    VOIRON
                           Owner . . . . .   Voiron, Jean
                           Serial number .   025456
                           Department . . .  0650
                           Transfer date .   880609
                           Transfer time .   214759
Receiving person :         Serial number .   079954
                           Owner . . . . .   MILON
                           Department . . .  0790
Transfer reason . . . . . . . . absent from 9/06/88 to 16/06/88
Indicate the protection code typed when you transferred your VM
(It will not appear when typed)    →         (0 attempts)
PF9    Help       PF12   Return
```

To cancel his transfer, the user has to type the protection code he selected when registering the transfer.

Having thus described from a technical as well as functional standpoint, the means involved in this invention, one may therefore fully comprehend the approval system operation. Approval system operations has however been summarized in FIGS. 14 through 17, and Function management in FIG. 18.

Figure 14:
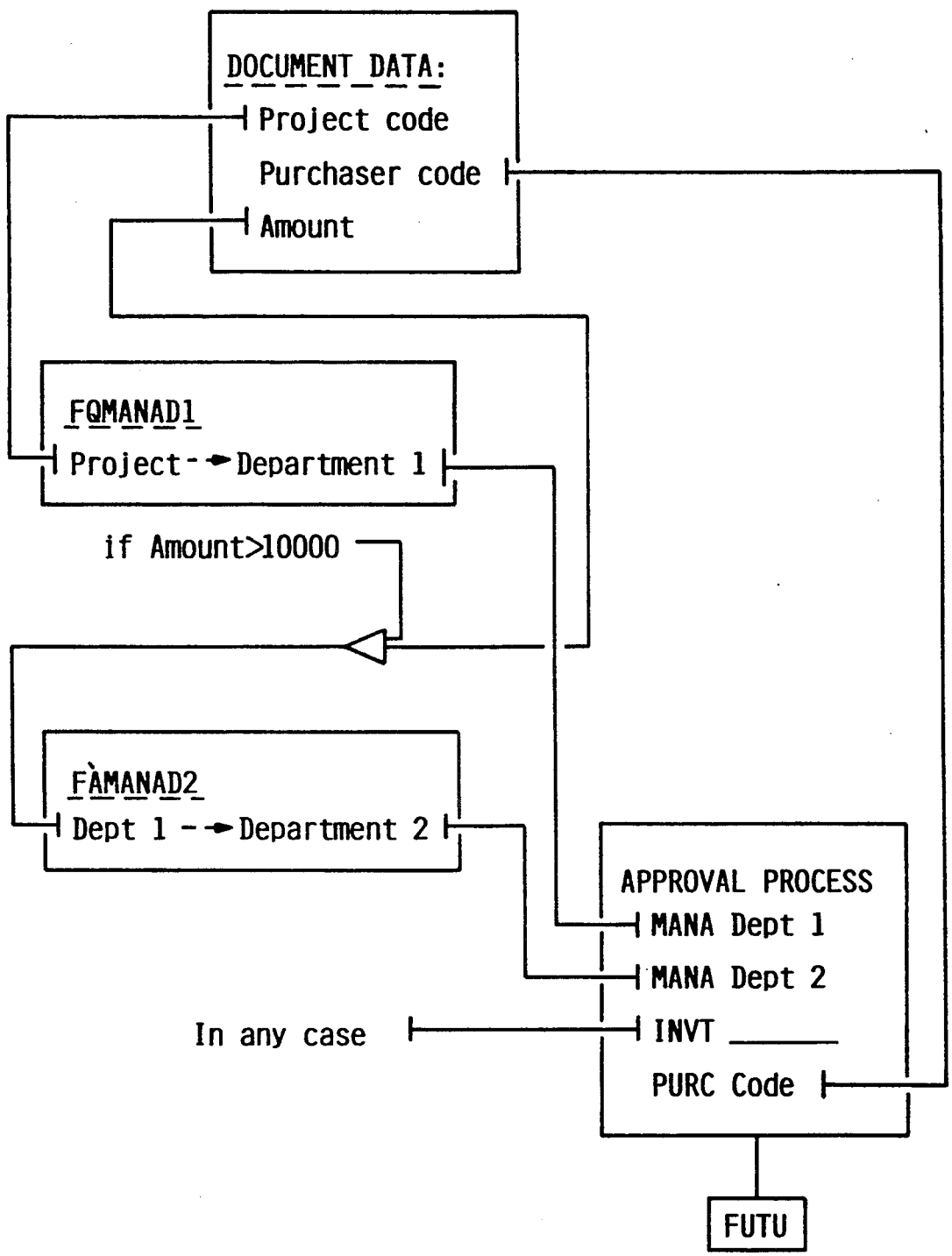
FIGS. 14–17: detailed flow charts of the invention operation.

Represented in FIGS. 14 through 16 are, the means involved in the determination of the list of approvers. Obviously, the system has been limited to simple cases to simplify explaining the operation. One assumes the filled-in document (e.g. Purchase Order) includes a Project code, a Purchaser code and an Amount of expenses set by the purchase requesting user. The software means uses the project code reference to address a first specific function table (FàMANAD1) and fetch the reference of the company department in charge of said project therefrom. Should, in addition, the purchase value exceed a threshold (10000), a second table (FàMANAD2) needs be addressed. Also, due to the type of document involving expenses, the logic adds an Investment Responsible (INVT) to the list of required approvers. Same applies to Purchaser (PURC). The system loads the information into two separate tables located in the document originator VM user's machine memory designated as FUTU and DONE respectively. The DONE table contains so called "shadow" approvers or virtual approvers whom the system will enable read-only access to the corresponding document. As already mentioned, once initiating the approval process, the originator may amend the list of approvers up to a certain extent based on predefined rules. For instance, deletion of a first line manager from the list of approvers will trigger automatic insertion of the second line manager, and so on.

Then, the originator sending decision has the effect to unload the first approver references from FUTU table into a NEXTWAIT table while the others are loaded into a NEXTFUTU table in the preset ordered list, both tables NEXT being in the user's VM machine. The shadows are loaded into NEXDONE table. The above mentioned tables will be used by the system for building and updating the corresponding SQL data base tables. i.e. APPFUTU, APPWAIT and APPDONE of the SEALBDA machine.

The SEALING system also controls mailing approval requests to designated approvers whose action are controlled as represented in FIG. 16.

The designated approver in NEXTWAIT gets access to the data in the corresponding SQL/DS tables in its own VM machines into FUTU, WAIT and DONE tables. Then NEXTFUTU, NEXTWAIT and NEXT DONE are set from FUTU, WAIT and DONE tables respectively. These tables contents are used by current approver to perform and record the following operations:

Approver list modification: the approver may amend the list as the originator was able to do.

Modification to approval process: the system controlled by any amendment to the data of document due to current approver, amends the approval path accordingly, and Approver validation: compliance test with the approver's designation rules is performed.

Tables updating are performed, i.e. once current approval is executed, a shift is operated with next approver in NEXTFUTU being shifted into NEXTWAIT.

Once forwarded, the current approval data are used to update the SQL/DS tables through add, modify or delete operations. They are then available for next approver's action and so on.

Figure 17:
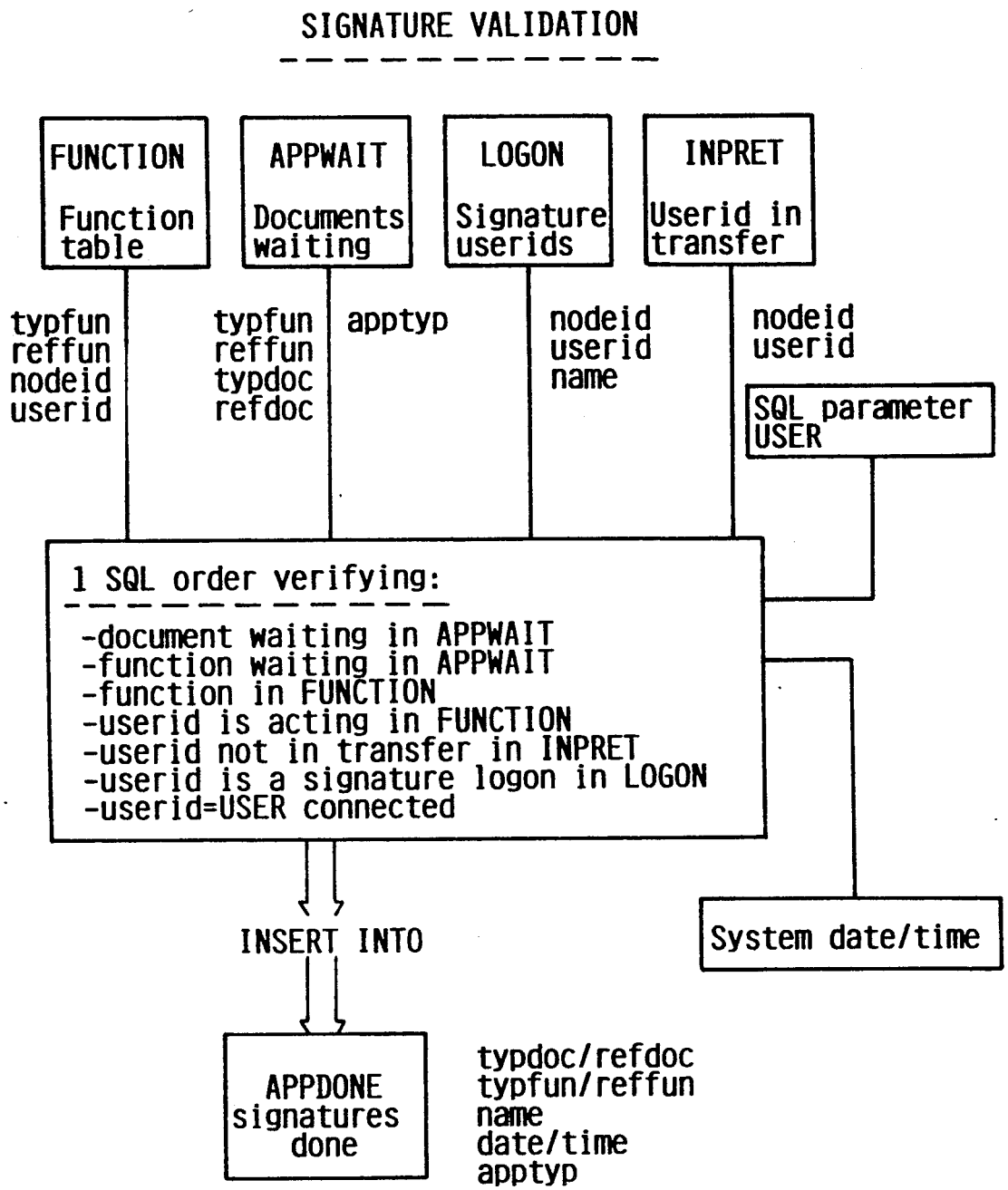

A fairly high security level has been provided in this invention to limit false approvals due either to human error or to voluntary operation. First, one should notice that approval. i.e. insertion of a "Y" or "N" flag into a predetermined field characterizing the considered document is inserted into the SQL/DS Table APPDONE otherwise accessible to the user on a Read-Only basis (see MYSIGNAT in FIG. 6). Second, said "signature" or approval insertion is operated only upon execution of a predetermined SQL command involving a signature validity check. The flow chart of such a signature validation operation is illustrated in FIG. 17. The SQL command triggered by the MYSIGNAT order accesses various SQL tables to gather data stored therein to ensure that the user presently trying to approve or disapprove is entitled to do so. First APPWAIT table is accessed to ensure that the considered document defined by typdoc/refdoc is waiting therein. Function defined by Typfun/Reffun should also match with user's function. cross-checked with function references and acting habilitation as provided by FUNCTION Table. Also, since VM machines might be transferred from one user to another (and recorded in INPRET Table accordingly). coinciding userid/nodeid with present user are checked. Then insertion into APPDONE Table, together with data and time are enabled upon a positive signature validation test result.

Figure 18:
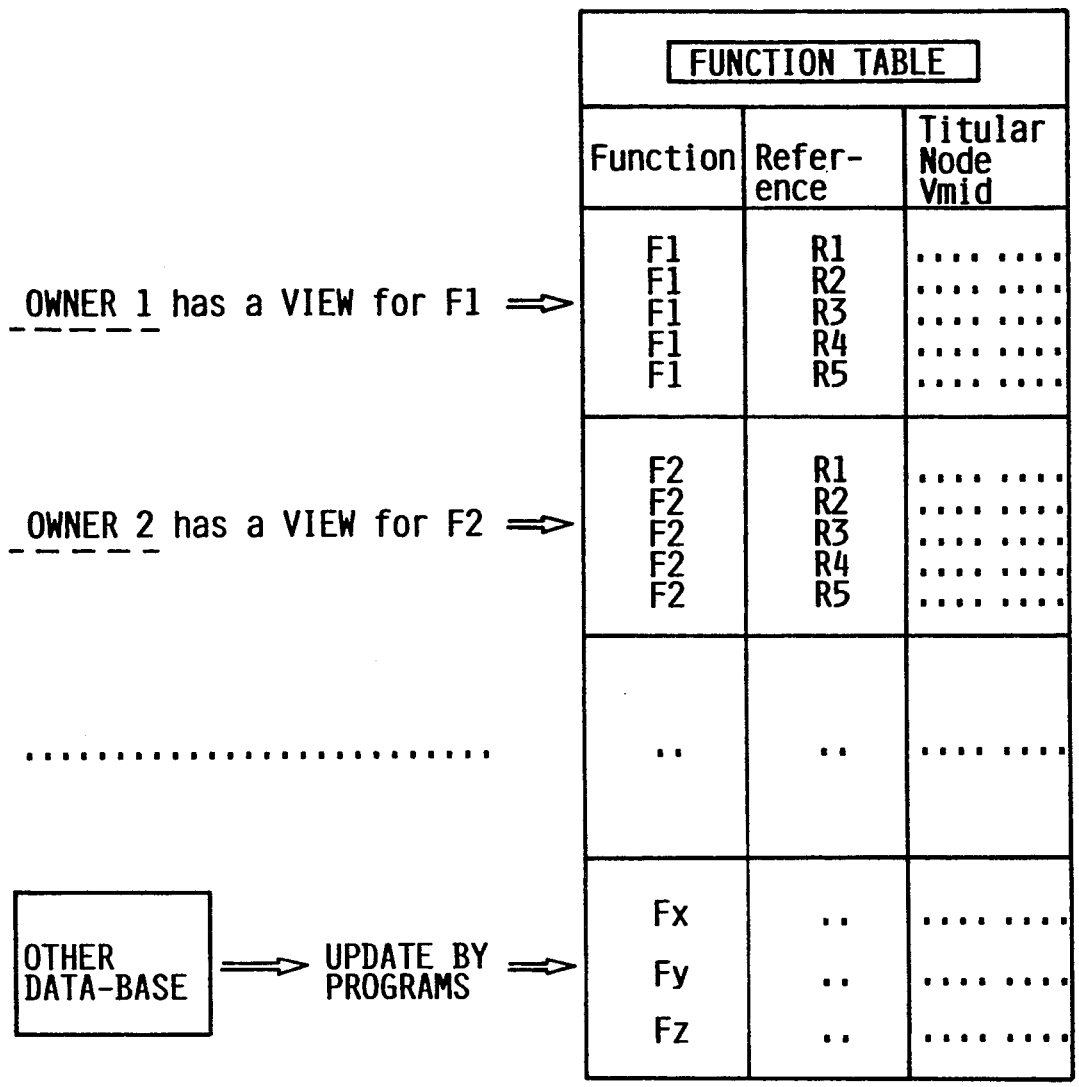
FIG. 18: a table to be used with the invention.

As mentioned, the population of users attached to the same approval system is managed in an unique SQL table, i.e. the FUNCTION Table, as represented in FIG. 18. For each function, i.e. Manager, Purchaser, etc. . . . a SQL view is defined to limit any user's access to the corresponding function. assuming he had been "granted" (SQL terminology) access. The system is made to grant access to a function "owner" responsible for creating and managing titular designation within each function. Some functions and titulars may already be known to other systems (e.g. within a conventional personnel department data base). In that case. Function table updating are directly performed by a program linking both involved data bases. A similar approach is also used for setting and maintaining the so called specific characteristic table.

While this invention has been described with respect to the preferred embodiment, it will be understood by those skilled in the art that various changes in detail may be made therein without departing from the spirit, scope and teaching of the invention. Accordingly, the herein disclosed is to be limited only as specified in the following claims.

What is claimed is:

1. An approval system for controlling the processing of a user originated document requiring signature by electronic approval by system selected users, in an electronic mailing system including terminals attached to a digital network, virtual machines (VM) including computer means, memory and software facilities assigned to individual users, each user being assigned at least one job or function within the population of system attached users, and means for generating processing and monitoring electronic documents to be mailed from any terminal to any user, said approval system comprising:

means for storing and updating function tables wherein each system user's function and address are identified;

means for storing document forms;

means for storing predefined approval rules, said predefined approval rules being based upon user function and the meaning of fields within said document forms;

terminal controllable means for selecting, accessing and filling-in a selected document form, thereby creating a filled-in form, said filled-in form requiring approval;

means for mailing and processing said filled-in form;

means sensitive to said mailing for accessing said function tables and said predefined approval rules and thereby generating an approval table means for determining an approval path based upon said approval table; and means sensitive to said approval path determination for monitoring the mailing and processing of said filled-in form.

2. A system according to claim 1 wherein said means for storing document forms comprises SQL data base tables and means for linking said tables together in a tree shaped arrangement.

3. A system according to claim 2 wherein said means for determining the approval path comprises:

means sensitive to said approval rules for reading document data by addressing specific SQL data tables;

means sensitive to said document data to address said function tables and fetch approvers references therefrom;

means sensitive to said stored approval rules for listing said approvers references in a predefined sequential order into an approval list; and, means for storing said approval list into a FUTU table.

4. A system according to claim 3 further comprising:

means sensitive to said document data for generating an additional list of users assigned access to corresponding document data on a read-only basis; and, p1 means for storing said additional list into a DONE table.

5. A system according to claim 3 further comprising:

means for displaying said FUTU table to the user requiring approval of said filled-in form;

means sensitive to said stored rules for enabling said originating user to check and amend said FUTU table; and, means for initiating approval of said filled-in form upon completion of said checking.

6. A system according to claim 4 further comprising:

means for displaying said FUTU table to the user requiring approval;

means sensitive to said stored rules for enabling said originating user to check and amend said FUTU table; and, means for initiating approval of said filled-in form upon completion of said checking.

7. A system according to claim 6 wherein said means for initiating approval comprises:

means for loading first approver in FUTU table into a NEXTWAIT table and loading remaining FUTU table contents into a NEXTFUTU table; and, means sensitive to NEXTWAIT contents for mailing a predefined message to a VM machine associated with an approver, said predefined message indicating that approval is required for said filled-in form.

8. A system according to claim 7 including:

means for unloading said DONE table into a NEXTDONE table within said VM machine; and means for unloading NEXTFUTU, NEXTWAIT and NEXTDONE user's tables into SQL tables APPFUTU, APPWAIT and APPDONE respectively.

9. A system according to claim 8 wherein said means for managing appropriate approvals comprises:

terminal controllable means for requesting access to system SQL tables, said terminal controllable means being controlled by a user;

system controllable means for accessing stored function tables, comparing identification of said user to approver's identification as stored into said function tables and upon positive check, unloading contents of predefined fields of APPFUTU, APPWAIT and APPDONE SQL tables into machine tables FUTU, WAIT and DONE, said machine tables being associated with said VM machine;

system controllable means sensitive to said machine tables contents for displaying preselected data from filled-in forms waiting for said user's approval;

user's terminal controllable means for selecting one of said filled-in forms whereby said selected filled-in form is being displayed to said user; and, terminal controllable means for said user inserting approval or disapproval decision into a predefined field in said selected filled-in form.

10. A system according to claim 9 wherein said terminal controllable means for said user inserting approval or disapproval decision comprises system controlled signature validation means and, upon correlative positive validity check, means sensitive to said validation means for writing user's decision into SQL table APPDONE, said APPDONE table being otherwise accessible only on a read-only basis.

11. A system according to claim 10 wherein said system controlled signature validation means include means for fetching a system prestored SQL command and means sensitive to said command for triggering said signature validity check.

12. A system according to claim 11 wherein said system controlled signature validation means comprises:
- means for addressing APPWAIT system table and checking presence of said filled-in form therein; and,
- means for addressing APPWAITing document data and function table to check concurrence with operating user's identification.

* * * * *